United States Patent [19]

Perlman

[11] Patent Number: 5,511,220
[45] Date of Patent: Apr. 23, 1996

[54] MULTI-USER COMPUTER SYSTEM WITH A CLOCK DRIVEN BATCH DISPATCHING MECHANISM

[76] Inventor: Noah Perlman, 3B Netanyahu Street, Or Yehuda 60376, Israel

[21] Appl. No.: 299,700

[22] Filed: Sep. 1, 1994

[51] Int. Cl.⁶ .................................................. G06F 9/00
[52] U.S. Cl. .................... 395/800; 395/650; 395/550; 364/230.3; 364/271.5; 364/281.3; 364/DIG. 1
[58] Field of Search ................................. 395/800, 700, 395/650, 550, 600; 364/131–134

[56] References Cited

U.S. PATENT DOCUMENTS

| | | | |
|---|---|---|---|
| 4,736,318 | 4/1988 | Delyani et al. | 395/700 |
| 4,796,178 | 1/1989 | Jennings et al. | 395/650 |
| 4,809,157 | 2/1989 | Eilert et al. | 395/650 |
| 5,012,409 | 4/1991 | Fletcher et al. | 395/650 |
| 5,115,392 | 5/1992 | Takamoto et al. | 395/650 |
| 5,291,595 | 3/1994 | Martins | 395/600 |
| 5,361,362 | 11/1994 | Benkeser et al. | 395/290 |
| 5,377,352 | 12/1994 | Tanaka et al. | 395/650 |

*Primary Examiner*—Alyssa H. Bowler
*Assistant Examiner*—Alpesh M. Shah
*Attorney, Agent, or Firm*—Gottlieb, Rackman & Reisman

[57] ABSTRACT

A computer system having a hardware timer clock for executing tasks requested by multiple users at random times has an operating system with a dynamic task batching feature that creates a managed wait table in a memory shared by a dynamic batch calculation mechanism and a computer clock based work related timer. The dynamic task batching feature and computer clock based work related timer are implemented as the front end of the operating systems wait routine and implemented by stealing the vector pointing to the wait routine.

25 Claims, 29 Drawing Sheets

MULTI-USER COMPUTER SYSTEM WITH A CLOCK DRIVEN BATCH DISPATCHING MECHANISM

FIELD OF THE INVENTION

This invention relates to an improvement in the timing effected by the hardware timer clock used in multi-user computer systems having dispatching processes that allocate CPU (central processing unit) access among tasks that require execution in near real time and that allocate computer resources to the various tasks. An example of such a system is a mainframe computer supporting a database management system that is maintained or queried from remote terminals; each task could be a single remote query, such as arrive from an ATM (cash machine) at a bank. More particularly, this invention relates to systems in which CPU efficiency is enhanced by having tasks that call upon similar resources assembled for execution into batches and where a computer clock is used to time out any period for the assembly of a batch in order to maximize the use of the central processing unit between batch executions by other processes running in the computer.

BACKGROUND OF THE INVENTION

With any computer system, whether multi-user or single user, it is necessary for the central processing unit to issue commands to sub-systems of the computer and to wait while these sub-systems accomplish their designated function and return control to the CPU. Efficient computer management requires that this waiting time, during which the central processing unit is essentially idle, be kept to a minimum. For example, in a single user environment the central processor might be waiting while a peripheral device such as a disk drive accesses its stored information. This entails steps that are repeated for each access. Since the instruction cycle time of the central processing unit is much less than the access time of the various peripheral devices, substantial time is saved if the number of calls on the device is reduced. Therefore, some mechanism is needed to minimize the number of independent calls upon the peripheral device for information. This may be accomplished for example by employing caches, which are simply portions of memory set aside to hold more information from the peripheral device than is immediately required. During a single access an intelligent guess is made of what information may be needed in a subsequent access and that information is stored in the cache. Subsequent access may quickly be made from the cache rather than having to return to the peripheral device.

In mainframe computers servicing multi-user environments, the opportunity exists for analogous savings at the task dispatch level. In this context a task is a request for immediate service by a user. Such a task may entail interaction with data base services of the computer. In particular, there are typically applications running on the mainframe, such as data processing applications and data base access applications in which control is transferred by the operating system to underlying routines in response to user requests. In each instance a certain amount of time is required to initialize routines and to access related peripheral equipment such as data storage devices. When these routines have several tasks to perform there is significant CPU overhead involved in passing control from the operating system and returning control. It is therefore advantageous that they execute these tasks at one time. On the other hand it takes time to wait for the multiple tasks to be assembled since they typically arrive at random times. This wait can impact response time. The ideal solution would be to batch as much work as possible in some minimal time frame that does not impact response time.

Systems have been developed wherein groups of similar requests are batched together before control is transferred to the underlying application. An example is the Multiple Region Batching Option Priority Dispatching Mechanism employed in connection with the IBM Customer Information & Communication System (CICS). A critical parameter for any such computer system is the number of calls for which the system will pause and wait for an accumulation before beginning to execute the calls in a batch. If this number is too small, little savings are achieved. If the number is too large, the system spends time waiting for the batch to become filled and the response time deteriorates. What is needed, is a system which can dynamically respond to the on-going activity in the computer in order to select an appropriate number of requests to be stored in a single batch.

Attempts to carry out this feature have to date, been unsatisfactory. IBM has tried to employ such an improvement in CICS, its on-line transaction processing system, which batches work before dispatch of its transaction processing system. This system employed a most straightforward attempt, i.e., it just set a fixed batch size. The problem with this system was that it did not take into account the amount of work outstanding nor the amount of time necessary to assemble a batch. Where the batch size was high compared to the amount of work that could arrive, a timer became the dispatch mechanism, defeating the advantage of batching by causing response time to degrade. The timer could only be set to a minimum of 100 milliseconds and defaulted to 3 seconds. A 100 milliseconds timer was too long and took a great deal of CPU resources to support. Where the batch size was set to a minimum, most if not all of the savings were eliminated.

IBM also provided an implementation where the batch size was set at a particular fraction of that user's outstanding file requests. This was however, unrelated to any time constraint or the nature of the events waited on. This system proved completely inadequate where the fraction required too many events to be completed when a large number of events were outstanding. It was dropped by IBM in its latest release.

Each of these prior art systems degraded response time excessively by either setting batch sizes without regard to outstanding work or relying on slow timers. The use of the standard timer mechanism in the IBM implementation also used excessive resources. In fact, setting the timer at the interval required for good response time, required 20–40 milliseconds would use up an order of magnitude more resources than the system could ever save. IBM therefore used a default, which however was many times too large to produce subsecond response times for typical applications. In current IBM technology the minimum timer length is on the order of 100 milliseconds, with a default to 3 seconds and is much too large.

BRIEF DESCRIPTION OF THE PRESENT INVENTION

The present invention comprises a multi-user computer system with a novel clock driven batch dispatching mechanism. It is employed in a computer having a central processor connected by a bus to a digital memory that receives signals at random times from a plurality of users and is connected by data lines to predetermined system resources. The processor is controlled by an operating system that responds to user-initiated signals stored at random times in the digital memory. The operating system employs a standard user wait routine, which is entered whenever the user requests a wait (Supervisor Call). Two elements combined to provide the advantages of the present invention.

The operating system assigns and modifies the priority of users or interrupts a task for a higher priority user. A Dynamic Task Batching Means is comprised in a portion of memory in which two program modules reside. These are the Dynamic Batch Calculation Mechanism and the Computer Clock Based Work Related Timer. The Dynamic Batch Calculation Mechanism provides a dynamic batch size for each user which is a function of the amount of work outstanding when a wait is requested by that user. The dynamic batch size is arranged to be a decreasing function of the amount of work outstanding. The mechanism operates by capturing the vector pointing to the operating system's wait routines and redirecting it to a novel mechanism. This mechanism on a user wait then changes the vector pointing to the user's wait list to a new wait list built by this mechanism. This new wait list is contained in a table shared by both modules and called a Managed Wait Table. The table contains information about additional events generated by the Computer Clock Based Work Related Timer. These events enter into the batch which will be executed. Many factors go into the determination of the number of these additional events. These factors include the original number of events waited on for the particular user, the number of events that the user has to wait for when it has no backlog of work of its own, and the percentage of the number of times that extra events had to be posted into the Managed Wait Table for this particular user.

The second module is the Computer Clock Based Work Related Timer. It provides a current clock time to the Managed Wait Table in a memory which is shared by both modules. When the time elapsed since the last scan of the Managed Wait Table (by the Dynamic Batch Calculation Mechanism) exceeds an allowed time, the module checks every waiting task and user and marks for dispatch by posting the additional events added to the user's original wait list, all those where work has been waiting past an allowable time threshold. This posting takes time, so the system collects information on the number of additional postings for a particular user and utilizes that information to influence the decision of how many events to add and how many total events to wait for in the future, in order to reduce the need for such postings in the future. In the event that a user has no outstanding work and is waiting for work to arrive, an estimated number of events is fabricated for that user, typically not to exceed two. Finally, recursive waits, that is waits which called other waits, are detected and eliminated by the program.

An important aspect of the invention is that both modules, and particularly the necessary timer functions, are incorporated (by vector redirection as mentioned above) as a front end into operating system functions that execute frequently, i.e. with a 99.9% confidence at about 20 times per second. This eliminates the need for a slow separate resource consuming clock or sophisticated operating system time functions, and automatically provides that the timer will be called upon as frequently as demands upon the system increase. Equally importantly, the system will not make unnecessary calls when the activity of particular users is slight.

The system operates by scanning the Managed Wait Table every user defined interval, normally 5–10 milliseconds and posting (i.e. adding to the complete events in the batch) one additional event per scan for users who have an uncompleted batch and have been waiting longer than the allowed time length 20–40 msec.

When the batch is ready for execution, control passes from the normal system wait routine. This employs another vector change at wait time and results in the return module taking control, restoring the values saved by the operating system at wait request time (by restoring register values from the Managed Wait Table and redirecting the vector pointing to the wait list).

The results of this system have been very significant. A transaction processing system that was being dispatched 4300 times a minute without this system was dispatched 600 times a minute with this system, an 86% reduction. This was accomplished without response time degradation and with 20% reduction in the processing time used by each transaction processing task.

It is an object of the present invention to provide a computer clock built into the front end of a standard system resource that effects a more efficient batch dispatching process for transaction driven systems running under multi-tasking operating systems.

It is a further object of the present invention to provide a computer clock based work related timer for storing time values in a managed wait table to effectuate a more efficient batch dispatching process for computer systems running under multi-tasking operating systems.

It is a still further object of the present invention to achieve such objectives in a system having a dynamic batch calculation mechanism for building such a wait list.

This and other objects of the invention will be explained in more detail in the preferred embodiment example which follows and should be understood in conjunction with the following drawings.

DETAILED DESCRIPTION OF THE PREFERRED EMBODIMENT OF THE INVENTION

A preferred embodiment of the multi-user computer system of the present invention may be implemented in connection with the IBM MVS/ESA operating system, a priority driven multi-tasking operating system, implemented on an IBM mainframe. A practical example would be the management of tasks called from multiple cash dispensing machines, where requests for cash could arrive from one or more machines at random times. Random in this sense does not necessarily mean devoid of all predictability; it is sufficient if tasks occur at times that have an element of uncertainty in their time of occurrence. Other tasks could be a data management system task that handles data requests from other tasks in the computer system.

Figure 1:
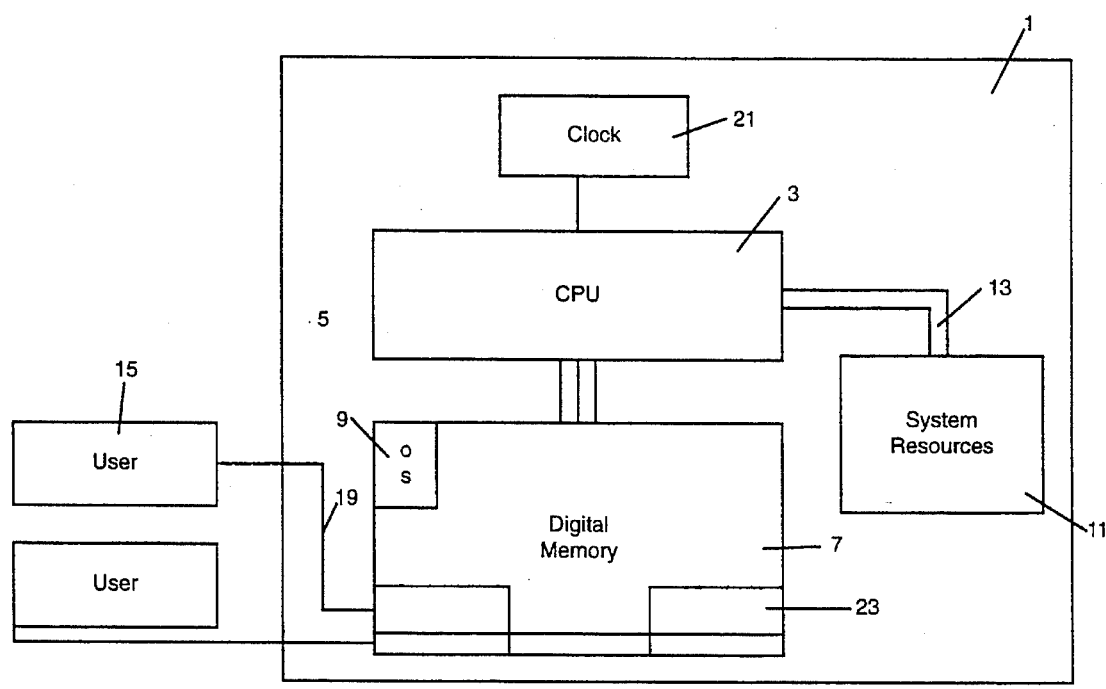
FIG. 1 is a schematic diagram of the overall configuration of the multi-user computer system of the present invention.

The computer system is shown schematically in FIG. 1. A mainframe computer has a central processing unit 3 that interfaces via a bus 5 with a digital memory 7. Stored within the digital memory during the operation of the computer is an operating system 9. Other system resources 11 interface with the CPU through data lines 13, which may be arranged in a bus. These system resources may be input/output devices, additional memory, or ports from which external devices may be further accessed. Users 15 are typically remote terminals interfaced with location in the digital memory 7. The user may also interface through ports within the system resources 11 (not shown). The user interface lines 19 may be data lines or any remote connection apparatus. The computer also has a clock 21 interfaced to the CPU 3.

Figure 2:
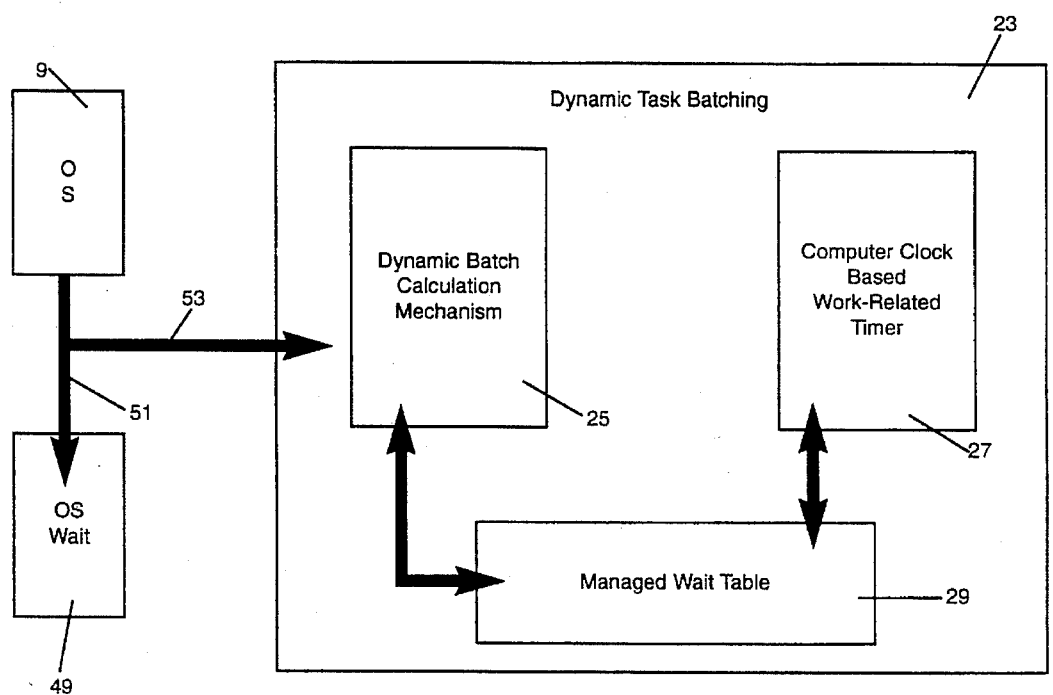
FIG. 2 is a schematic diagram of the dynamic task batching module and its component sub-modules.

Within the digital memory 7 as shown in FIG. 2 is a Dynamic Task Batching mechanism 23, which comprises an area of code comprising two modules, a Dynamic Batch Calculating Mechanism 25 and a Computer Clock Based Work Related Timer 27. Both of these modules (through the intermediary of the CPU) maintain a portion of shared memory termed a Managed Wait Table 29. The heavy double headed arrows of FIG. 2 indicate the ability of the modules to control and read data into and from the Managed Wait Table.

Figure 3:
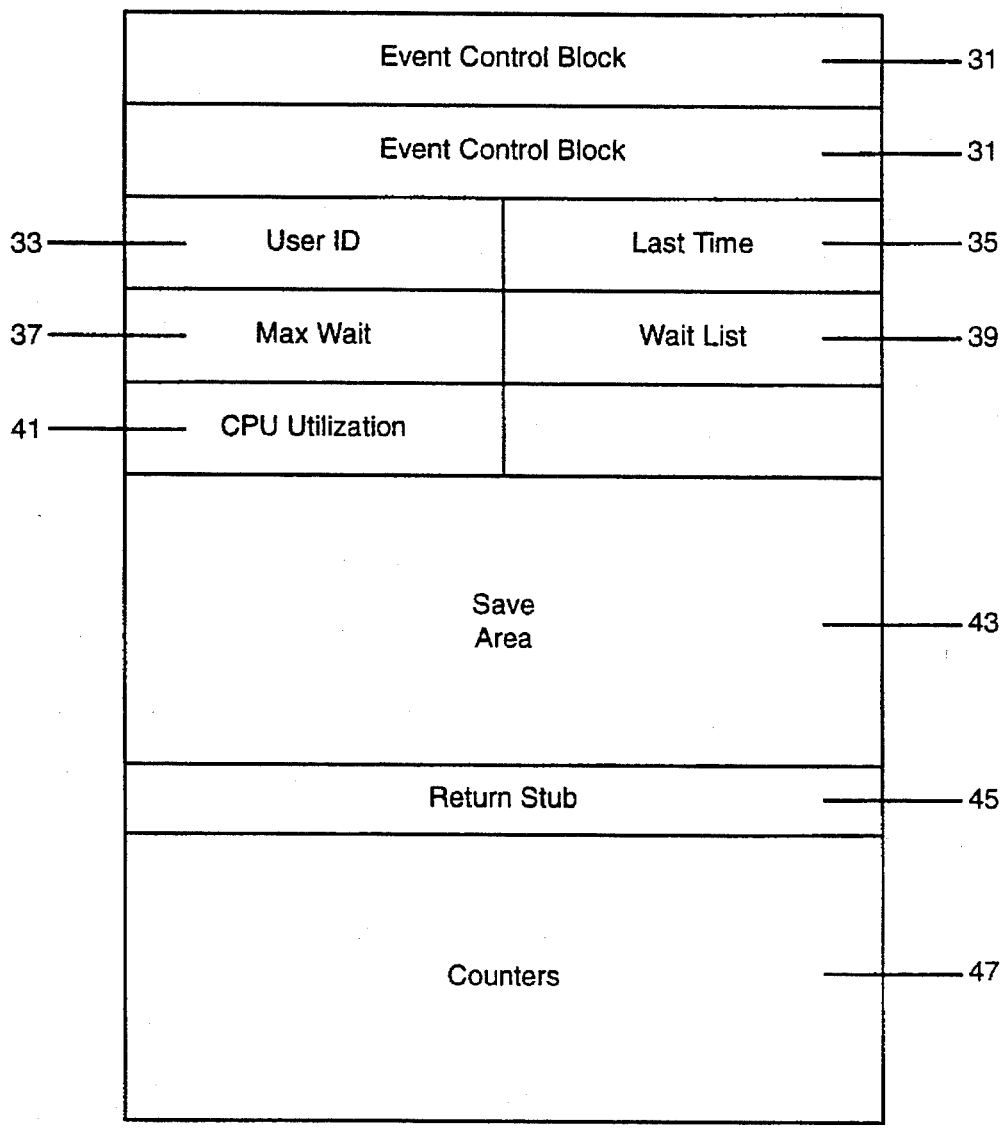
FIG. 3 is a schematic depiction of the managed wait table of the present invention.

The structure of the Managed Wait Table is further indicated in FIG. 3. The wait table contains memory locations dedicated to contain the following information: user identification 33, the time of the last wait 35, the maximum wait duration allowed for this user 37, a list of up to 255 events that are waited on 39, the users CPU utilization during the previous 500 waits 41, Event Control Blocks 31, a save area 43 for the contents of the user's registers and other necessary data, a return routine stub 45, and counters and statistical information 47.

As shown schematically in FIG. 2, the operating system 9 calls to its wait routine 49 through a vector 51. The present invention dynamically redirects that vector to another vector 53 which points to the dynamics task batching module acts as the front end of the operating system wait routine. When the operating system determines that the managed system should wait no longer before executing its task(s), the values of the task can be restored from the managed wait table and the vector 53 redirected through vector 51 to permit completion of designated tasks.

The operation of the system will be explained in greater detail below, in conjunction with flow chart FIGS. 4A–8D after the following summary description.

The preferred embodiment of the system consists of a startup routine whose main function is to prepare certain storage areas for tables to be shared by the main routines, namely the dynamic batching routine and the work related timer routine. These areas are the managed wait table and the shared area for storing the dispatching process routine. Since the calls to the wait routine need to be redirected to the dispatch process routine, the startup routine steals the pointer to the system wait routine and replaces it with a pointer to the dispatching process routine.

The dynamic batching routine fills the managed wait table with data that it will utilize and that will be made available for the work related timer routine.

The dynamic batching routine begins by updating CPU utilization information every 500 waits. Users that have low CPU usage are dropped from the scheme. A flag is set to determine if this is the first wait for a particular user and recursive waits are dropped. A check is made that sufficient room exists to store the parameters necessary to restart the wait routine; this typically requires sufficient memory to store the register values of the processor. If there is not sufficient memory to restart the system or the restart cannot be recalculated, the particular wait is dropped. A back end is constructed to allow the system to be restarted. The information necessary to implement the back end is also placed into the wait management table.

When it is determined that an additional wait should be introduced a management event control block is added to the managed wait table. At this point data is provided to determine the base wait length calculation and an iterative procedure accumulates the additional waits. A number of waits is added to the no-work base, which is recalculated every pre-determined number of waits, presently preferred at 500 waits. Additional event control blocks are added to the wait management table.

Pointers are set to the Managed Wait List and the clock time of Wait is set. Having completed the function, the system is allowed to execute the system wait.

The separate Computer Clock Based Work Related Timer routine begins with a wait request. It obtains the time of the request and compares it to the time of the last wait table scan. After a time out it obtains the wait table scan lock, which enables only one user's time to control since there is no need for each user to put its two cents in. Then the entire table is scanned for an active user. If no user is active there is no need to post them. The duration of the user waits is calculated at this point.

The dispatching process combines two key elements: a dynamic batch size calculation determines the dynamic batch size based on the amount of work outstanding at wait time. Batch size is a percentage of the actual work outstanding. This percentage is a declining number as the system waits for more events. Since there is a high probability that a system waiting for 10, 50 or 100 events will complete the next event before the system finishes processing the first three, there is no reason for the system to wait for very large numbers of events. However, in order to insure that the system is ready within a reasonable response time, a second element is provided, namely, a computer clock-based work related timer. This is a process implemented using the computer clock. An important aspect of the invention is that this resides in one or more commonly used system function as that function's front end. The clock is thus achieved with minimal overhead by incorporating the process into commonly used system functions. The process causes the system to dispatch transaction processing systems and data base management systems that have work outstanding. The preferred implementation for both functions is to incorporate them into front end to the standard MVS/ESA wait function (SVC, supervisor call). The system includes a dynamic batch size calculation routine which operates in the following manner.

The dynamic batch size calculation routine is built as a front end into the operating systems standard user wait routine, which is entered whenever a user requests a wait (supervisor call 1). Whenever an eligible user goes into a wait, the dynamic batch calculation routine evaluates how many events the user is waiting on currently and estimates the number of events the user waits for when the user has no outstanding work and is waiting for work to arrive. This estimation of the true no-work wait case is done continuously.

The dynamic batch calculation routine for eligible users builds a new wait list containing the original list of events that the user is waiting for plus an additional number of events generated by the computer clock based timer. The number of events is calculated for each user and each wait dependent upon the original number of events that the user is waiting for, the number of events waited on in the no-work wait case, and the percentage of times each extra event had to be posted by the computer clock based work related timer. In the preferred embodiment, the number of additional events need not exceed two or three for maximum benefit. This number is then added to the number of events that the user requested to wait on in his wait request.

After the wait completes, the user must access his original list and wait values. A back end restores these values before returning control to the user. Additionally, since the waits can be recursive (the system may itself issue a wait to service a user's wait request) certain wait requests must be eliminated, namely, those that become recursive and those where it is not possible to restore the user's original values.

Having completed the functions of the present system, control is then passed on to the normal system wait routine. Thus, the dynamic batch calculation routine insures that the transaction processing system or database management system receives the maximum amount of work that can be collected in a specific time interval. The time interval is calculated so that the maximum amount of CPU resources can be saved on unneeded dispatches. A computer clock-based work related timer keeps track of the time interval for each eligible user.

The computer clock-based work related time process is implemented as follows:

The timer process is dynamically added to system functions that execute with 99.9% confidence at 20 times a second for the preferred implementation. The preferred implementation is the system's standard function for entering waits.

When the transaction processing systems requests a wait, it current clock time is recorded by the dynamic batch size routine in a shared memory table which is utilized by both processes. This table is called the managed wait table. Whenever any task in the system waits, the computer clock-based work related timer compares the current clock time to the time of the last scan of the managed wait table. If the last scan was more than the allowed scan delay time, the routine will scan the managed wait table checking all the waiting transaction processing tasks, database management system tasks, or other eligible users in this system.

The timer will mark for dispatching any transaction processing task that has work waiting and is passed its allowed wait time duration threshold. This is done by scanning the wait management table, checking if the user is still in wait and still exists, checking the elapsed time of its wait by subtracting time of wait, stored in the managed wait table, from current clock time and checking if that difference exceeds the allowed elapsed wait time. For the preferred implementation, this is about 20 milliseconds. If all these conditions are met, the added events are posted one each scan.

In the ideal situation, the number of events waited on occurs before the wait duration interval expires. These additional posts of added events add overhead. For that reason, the percentage of times that these extra events had to be posted is collected and will influence the decision of how many events to add and how many total events to wait for in the future.

In this way, a dynamic batch size is achieved, which is dependent on work expected and a hardware clock timer mechanism which can be as accurate as the time between use of the system's functions that it front ends is employed. The added overhead of this timer is almost non-existent. There is now one timer that can be shared among all users. This timer will never go off and dispatch a transaction processing task if there is no work for it to do.

The results of this process reduced the dispatches of a transaction processing system from 4,300 times a minute to 600 times a minute, an 86% reduction. This was accomplished without response time degradation and with a 20% reduction in the processing time used by the transaction processing task.

A detailed description of the steps of the preferred embodiment is shown in FIGS. 4 through N and is detailed in the following description:

COMPUTER CLOCK BASED DISPATCHING PROCESS START-UP FLOWCHART

FIGS. 4A–4E describe the start-up and initialization process required to implement the Computer Clock Based Dispatching Process.

In the preferred embodiment, a start-up routine initializes the system and remains to handle control and information requests from the operator as well as termination requests.

Figure 4A:
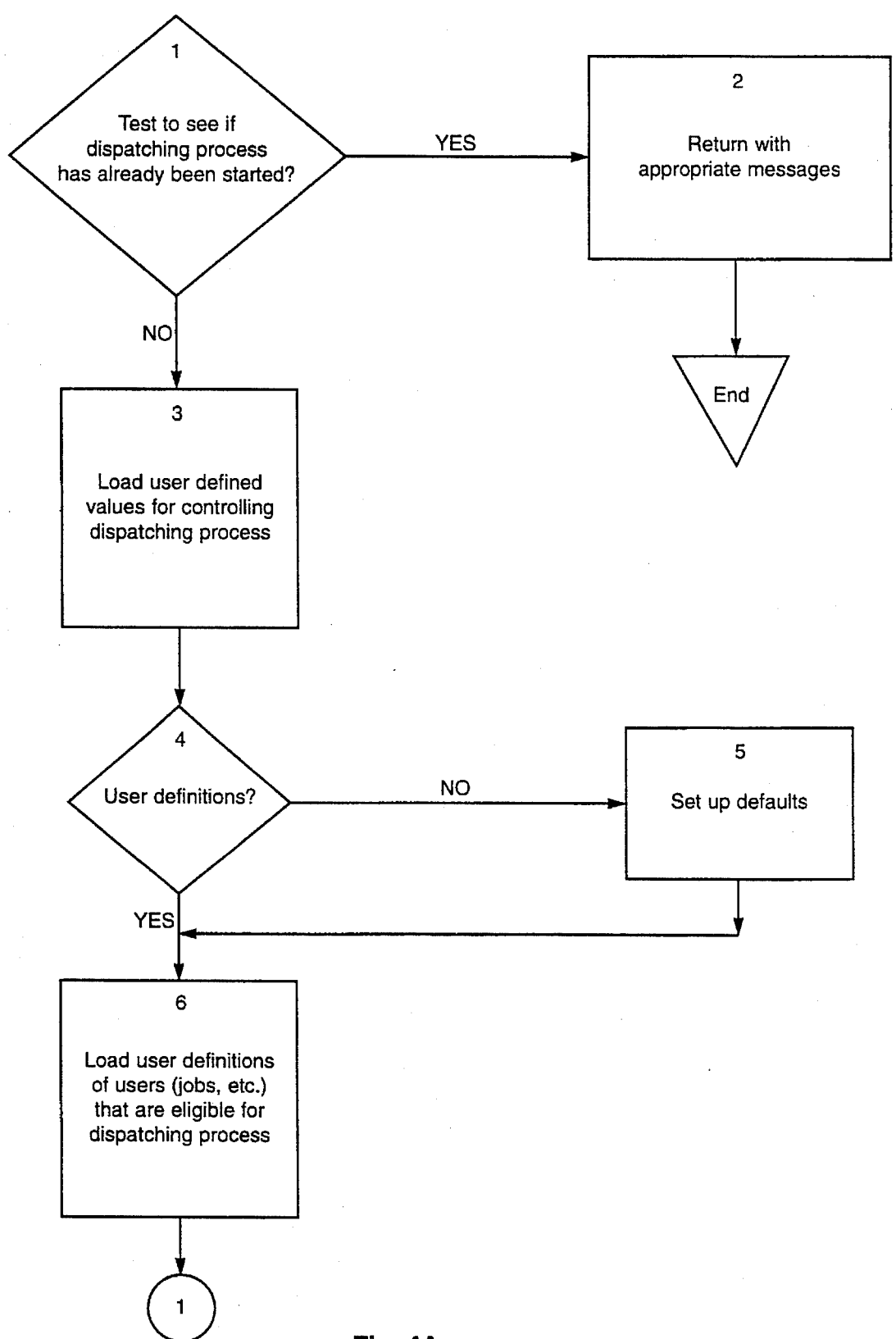
FIGS. 4A–4E are a flow chart of a preferred module for a computer clock based dispatching process startup routine.

As shown in the flow chart of FIG. 4A, 1.,2. The routine checks to see if the dispatching process has already started. This is done by attempting to acquire an enqueue on a logical resource that is unique for this dispatching process. If the resource is held, the start-up was already performed and the routine exists with error messages.

3., 4., 5. The routine tries to load user defined values for the parameters used by the dispatching process. If the load fails, the default values are used.

Figure 4B:
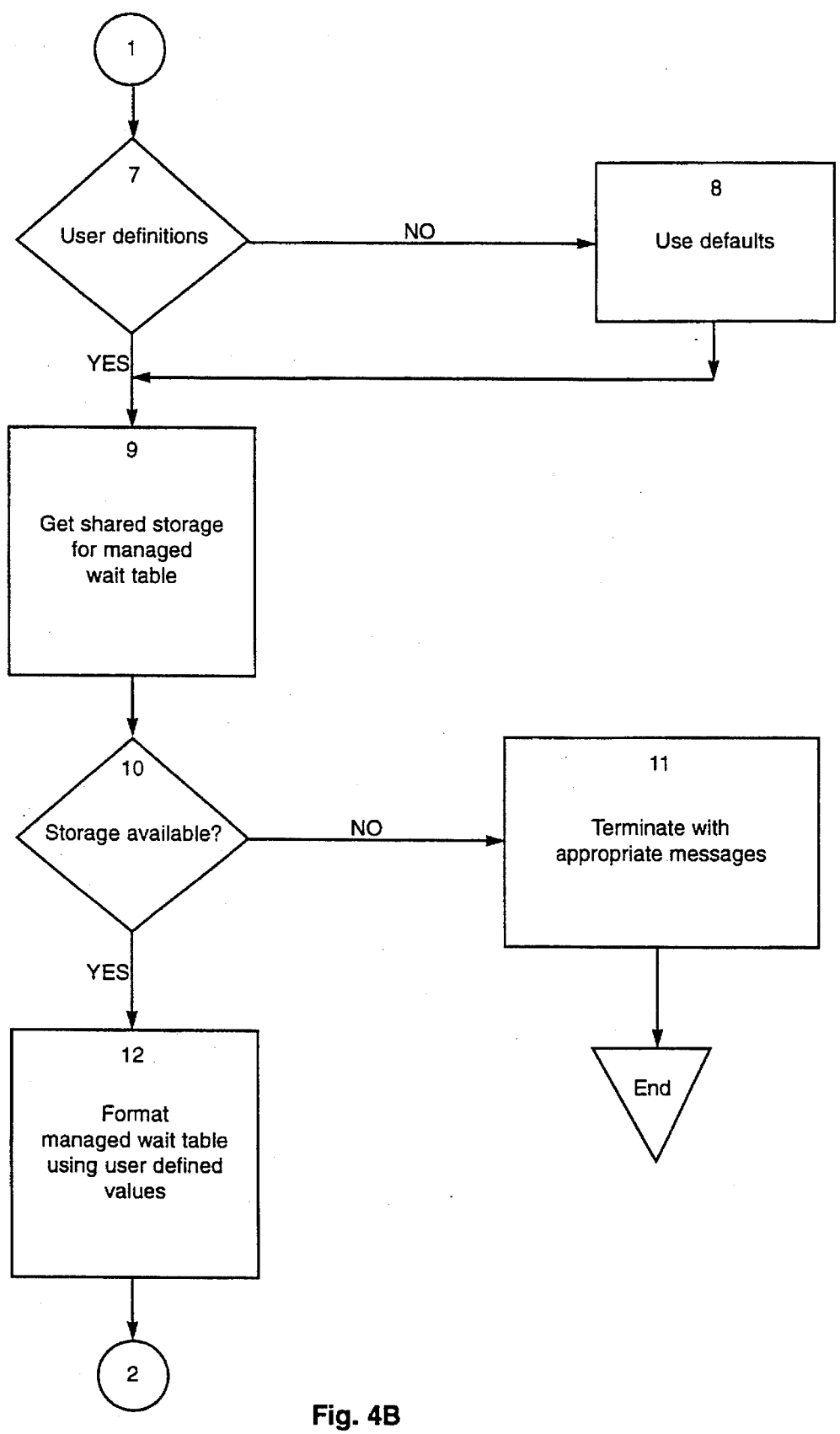

As shown in the flow chart of FIG. 4A–4B, 6., 7., 8. The routine tries to load user defined names of users eligible for the dispatching process. If the load fails, the defaults are used.

9., 10., 11., 12. Shared storage is obtained in order to build the Managed Wait Table. If the storage is unobtainable, the start-up terminates with error messages. The table is built using the user defined values loaded in step 3.

Figure 4C:
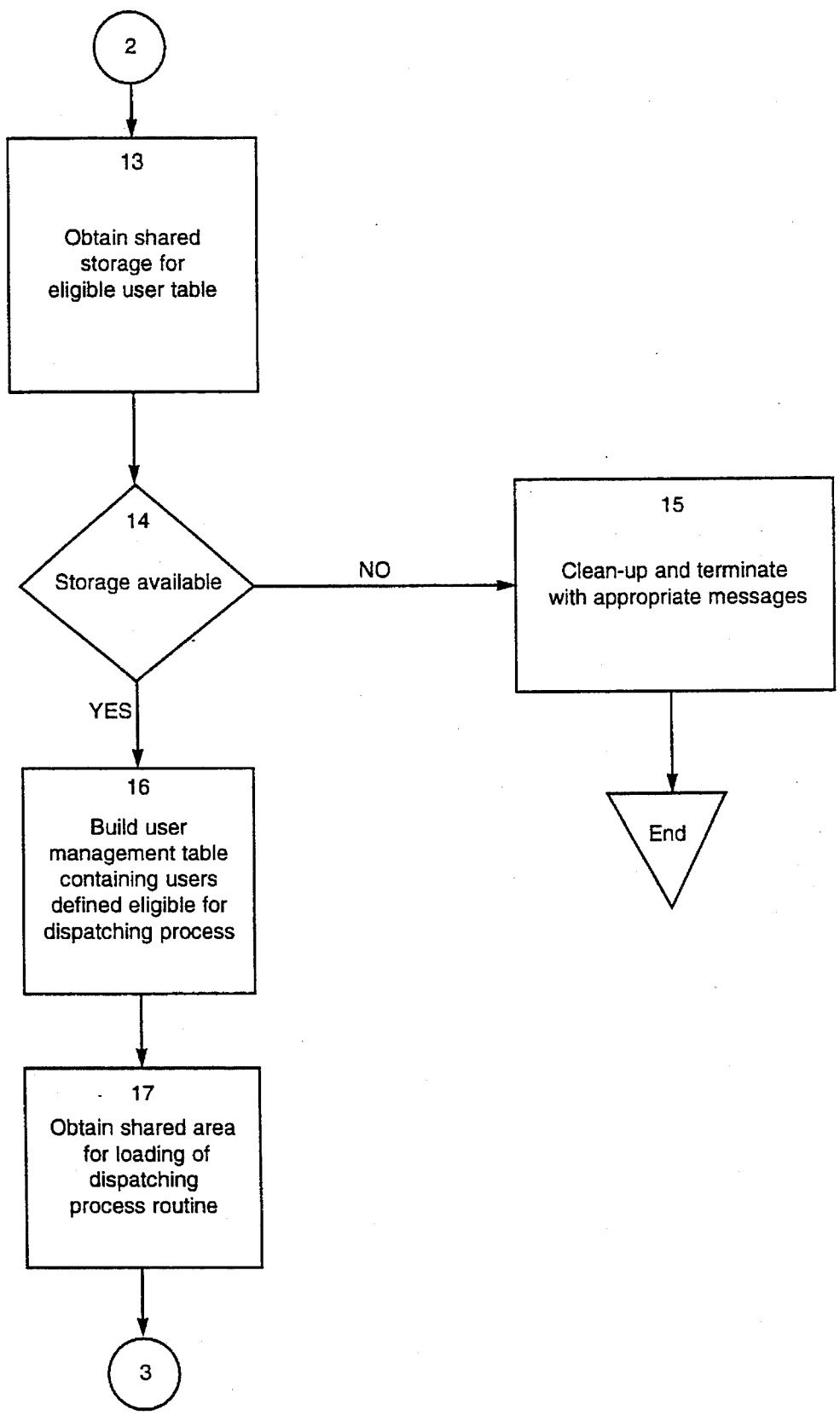

As shown in the flow chart of FIG. 4C, 13., 14., 15., 16. Shared storage is obtained in order to build the Eligible User Table. This table contains the information listed in the Notes On The Dynamic Batch Size Calculation Routine Flowchart. If the storage is unobtainable, the start-up terminates with error messages. The table is built using the user defined values loaded in step 6.

Figure 4D:
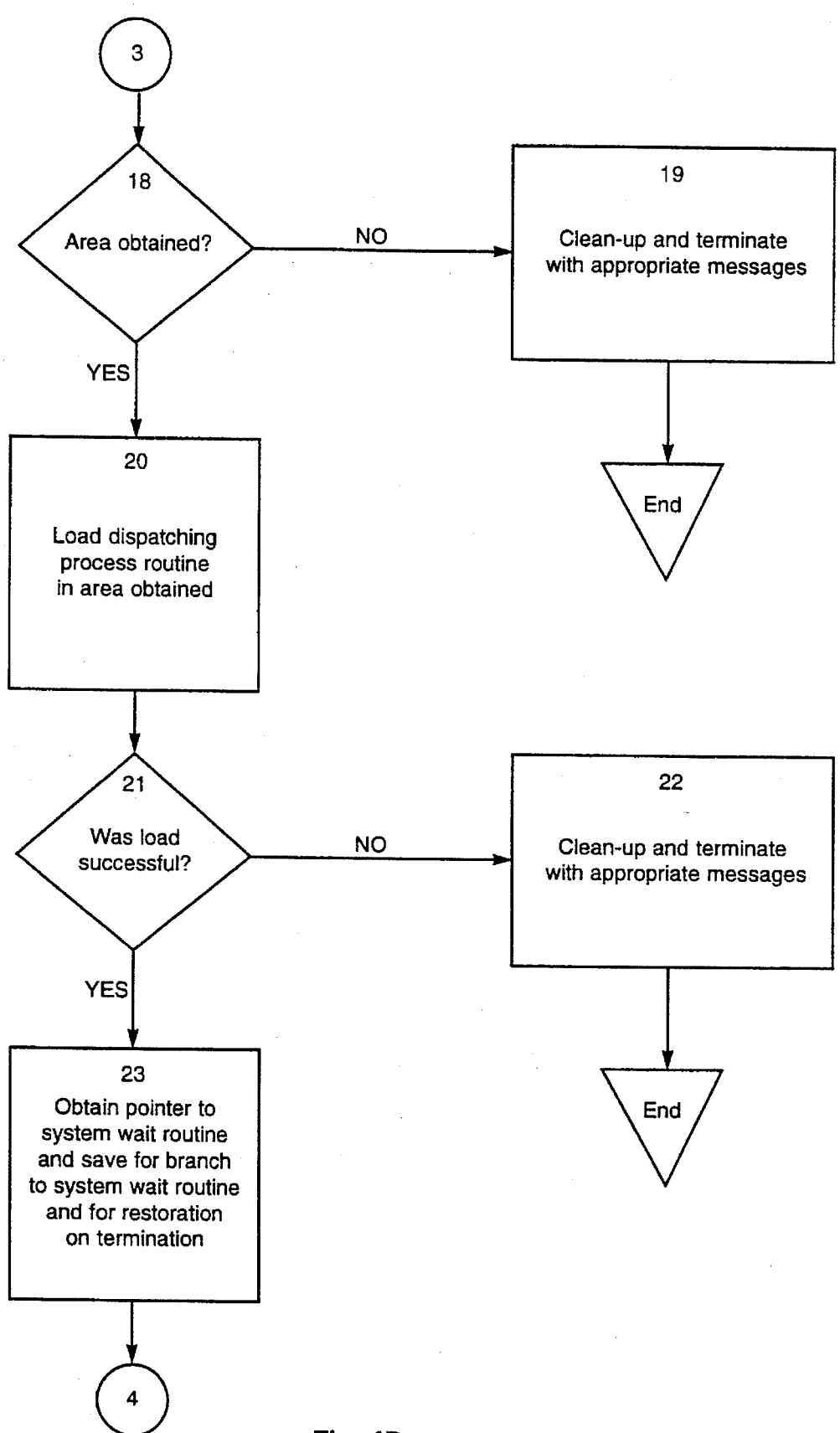

As shown in the flow chart of FIG. 4C–4D, 17., 18., 19., 20., 21., 22. Shared storage is obtained for the entire Dispatching Process Routine. The routine is then loaded into this storage. If the storage is unobtainable or the routine load fails, the start-up terminates with error messages after freeing any shared storage acquired.

Figure 4E:
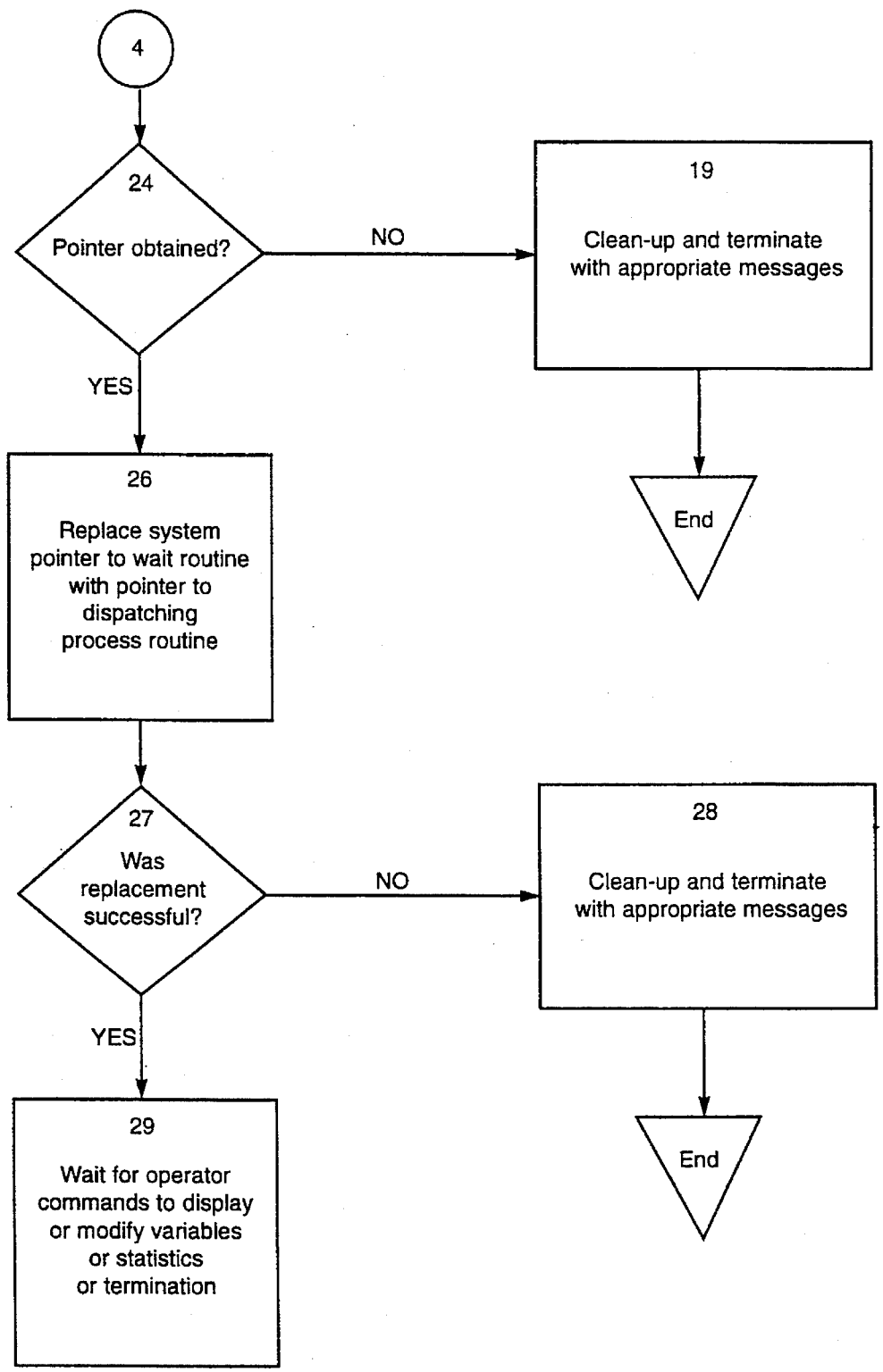

As shown in the flow chart of FIG. 4D–4E, 23., 24., 25., 26., 27., 28. A pointer to the system wait routine is obtained and saved in the Dispatching Process Routine. The pointer in the system wait routine is changed to point to the loaded Dispatching Process Routine. If the system pointer is unobtainable or the pointer cannot be changed, the system terminates with error messages and frees all shared storage acquired.

29. The start-up of the Computer Clock Based Dispatching Process has completed successfully. Wait for operator commands.

DYNAMIC BATCH SIZE CALCULATION FLOWCHART

This routine, as shown in FIGS. 5A–5K, is installed as the front end of the standard wait processing routine. It gets control whenever the user issues a wait request. This routine uses two tables: managed Wait Table and Eligible User Table. These tables are initialized on start-up. (See relevant flowchart). These tables contain the following information:

The Eligible User Table contains the names of users whose dispatching is to be managed. In the preferred implementation, these are the names and/or generic names of Jobs and Started Tasks.

The Managed Wait Table contains:

A. User Name and associated control block information necessary for uniquely identifying user and checking is continued existence.

B. The time of last wait.

C. The maximum wait duration allowed for this user.

D. A list capable of holding N events that are waited on. (For the preferred implementation, N is 255.

E. User's CPU utilization during previous M waits. Recalculated every M waits. (For the preferred implementation, M is 500.)

F. Additional Event Control Blocks that are posted on completion of an event. (For the preferred implementation, the number is 2.)

G. A save area to save user's registers and other necessary data.

H. A return routine stub. This routine gets control after the wait instead of the user's routine and completely restores the user's environment before returning control to the user's routine, where he expects to regain control after the wait.

I. Counter's and statistical information.

Figure 5A:
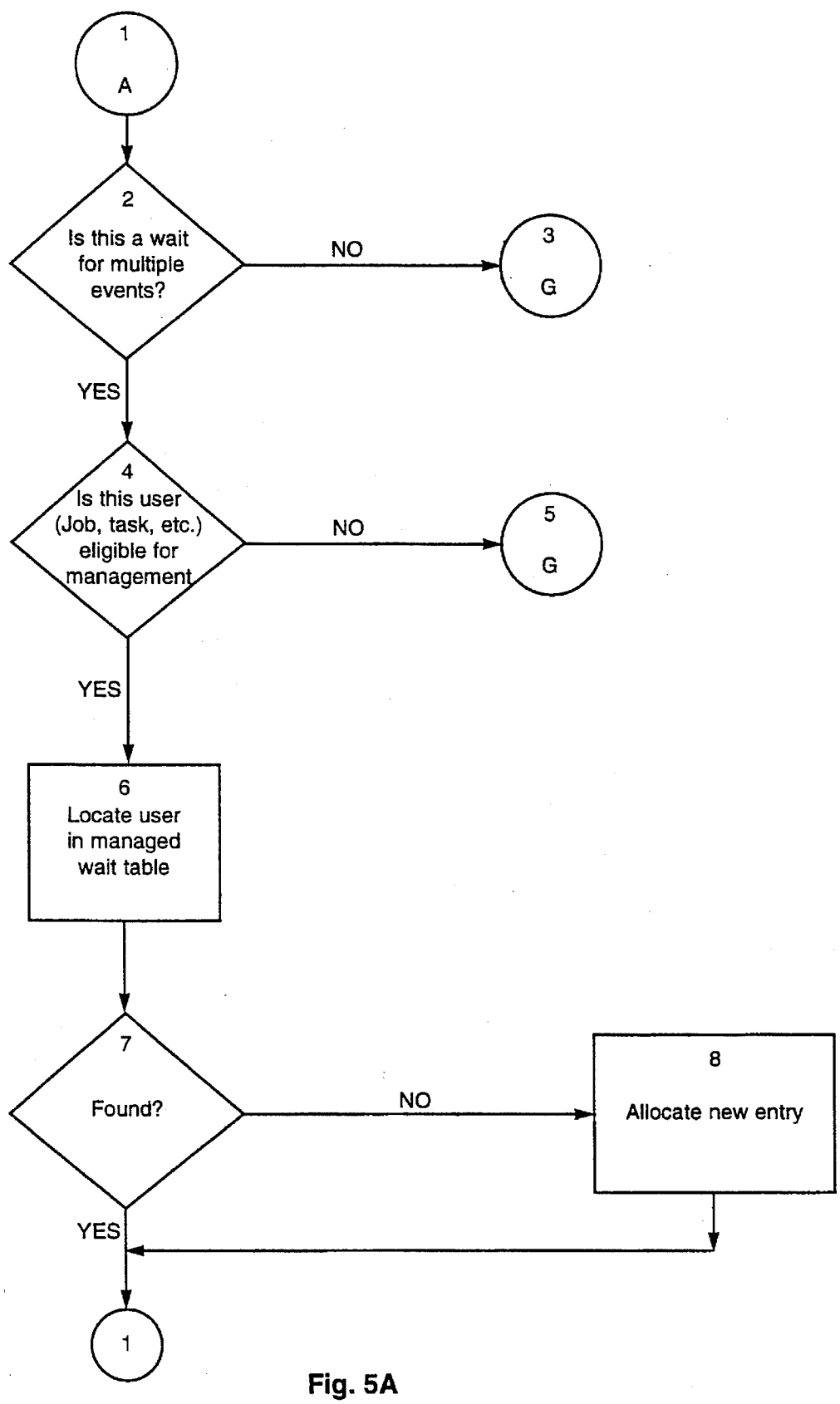
FIGS. 5A–5K are a flow chart of a preferred module for a dynamic batch size calculation routine.

As shown in the flow chart of FIG. 5A, 1. The Computer Clock Based Work Related Timer Flowchart contains a shadowed circle containing an 'A'. This 'A' refers to the beginning of wait processing described in this flowchart.

2.,3. The wait the user issued is checked to see whether it includes multiple events or just one event. If the wait is not for multiple events, control is transferred to the system wait routine.

4., 5. The user is then checked against the Eligible User table to see if its dispatching is eligible for management. If not, control is passed to the system wait routine.

6., 7., 8. If the user does not have an entry in the Managed Wait Table, allocate an entry for this user.

Figure 5B:
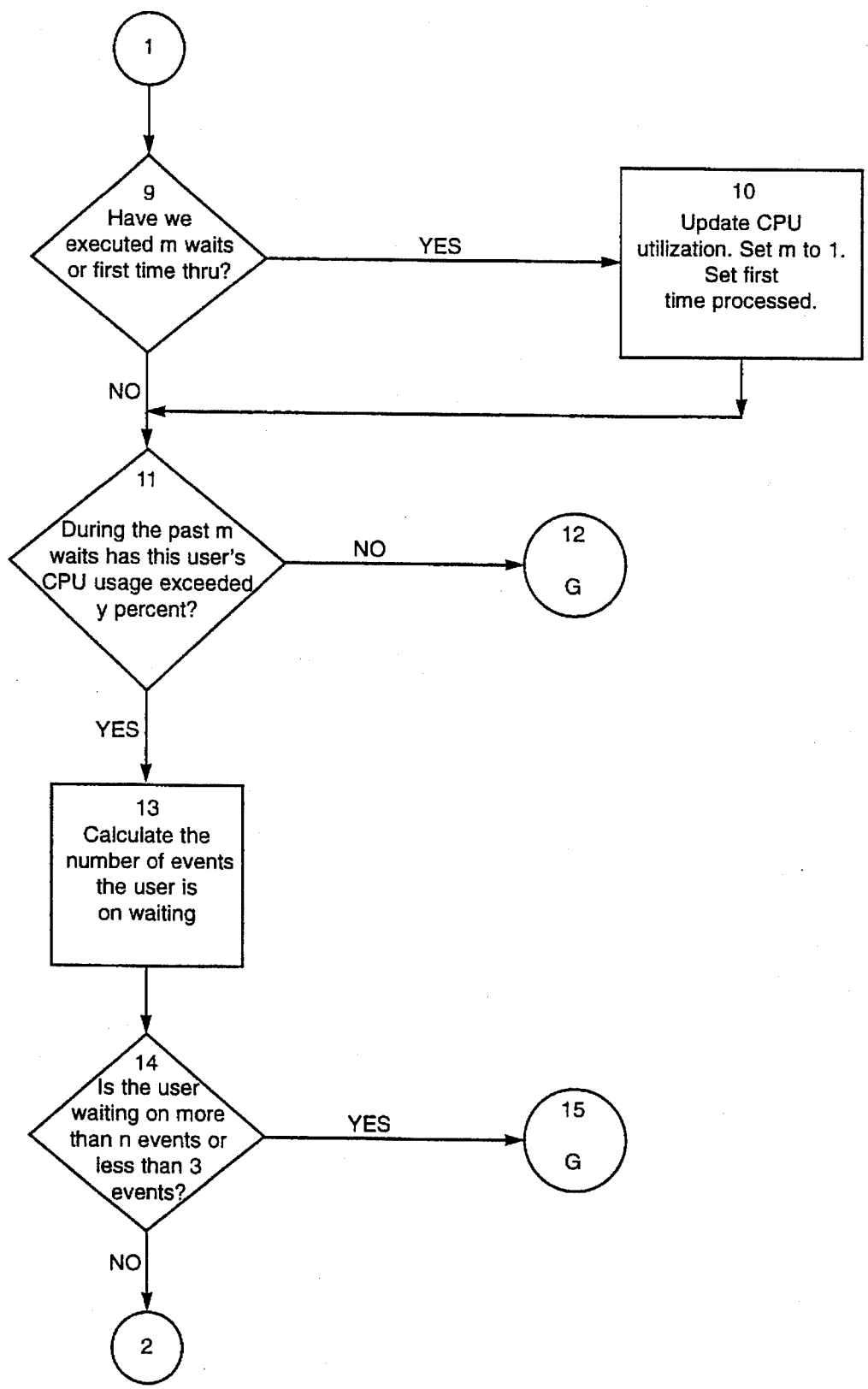

As shown in the flow chart of FIG. 5B, 9., 10., 11. The user's CPU utilization is checked every M waits. (For the preferred implementation, M is 500). If the user's CPU utilization is below a user defined threshold, (preferred implementation 10%), there is no significant savings to be gained by managing the dispatching of this user.

12. If the CPU utilization does not exceed the threshold value, transfer control to the system wait routine.

13., 14., 15. If the user is waiting on less than 3 events, there is no real benefit from batching the work. If the user is waiting on more than N events, there is no room in the Managed Wait Table to build a new wait list. It adds significant overhead to get a new wait list for each wait. In these cases, statistical counters are updated and control is passed to the system wait routine.

Figure 5C:
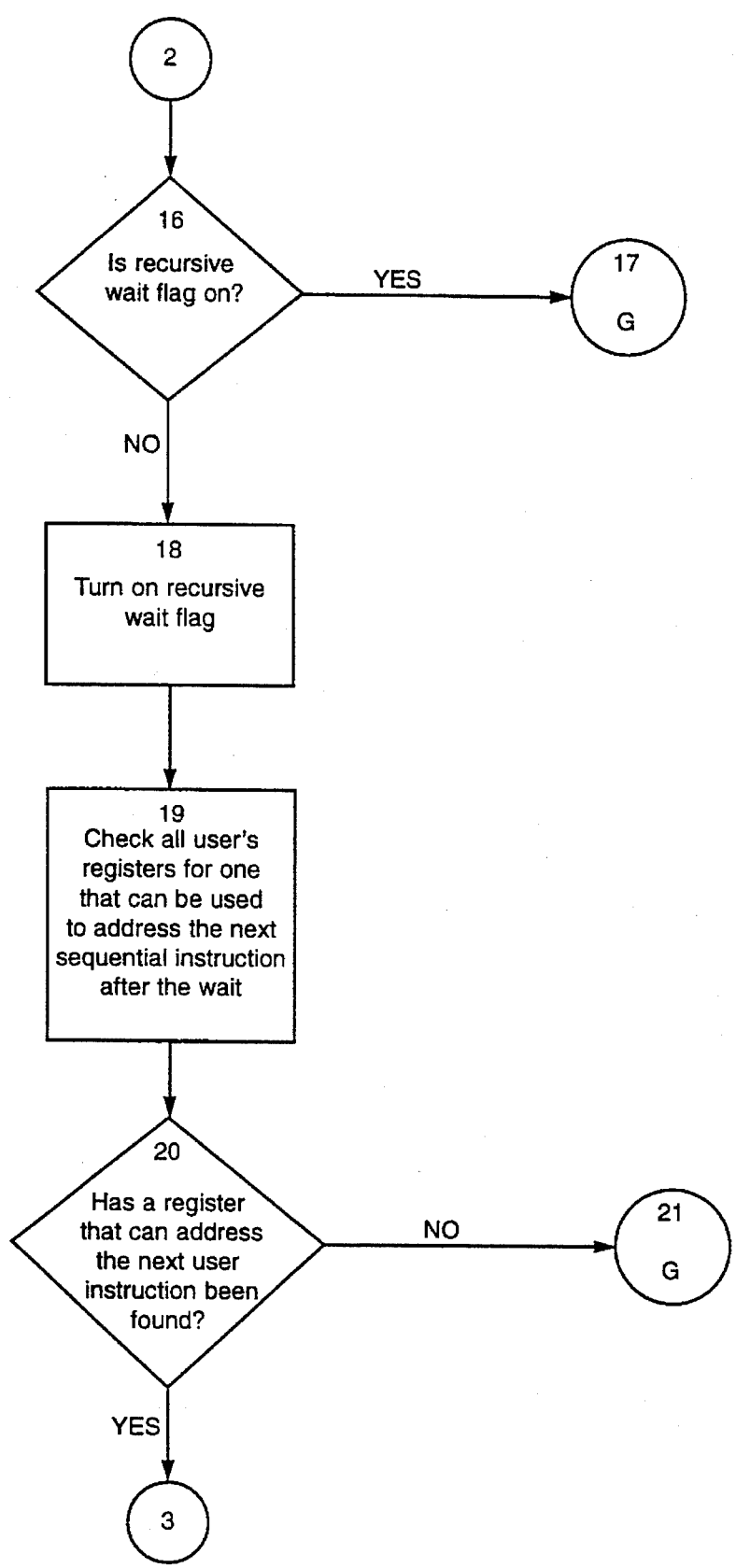

As shown in the flow chart of FIG. 5C, 16., 17., 18. Since a user wait can generate, in its processing, a wait by the system wait routine for a resource needed to process the user wait, it is necessary to check if this is the first time through. If not, pass control to the system wait routine. (This flag is turned off in the back end processing routine.) If it is the first time through, turn the recursive flag on.

19., 20., 21. The user must get control after the wait at the place designated. For the preferred implementation, this is the next sequential instruction. Additionally, all the user's registers must be restored. In order to achieve this result, there must be, at wait time, at least one register which can be used to address the return point, or in the preferred case, the next sequential instruction. If such a register does not exist, control is passed to the system wait routine.

Figure 5D:
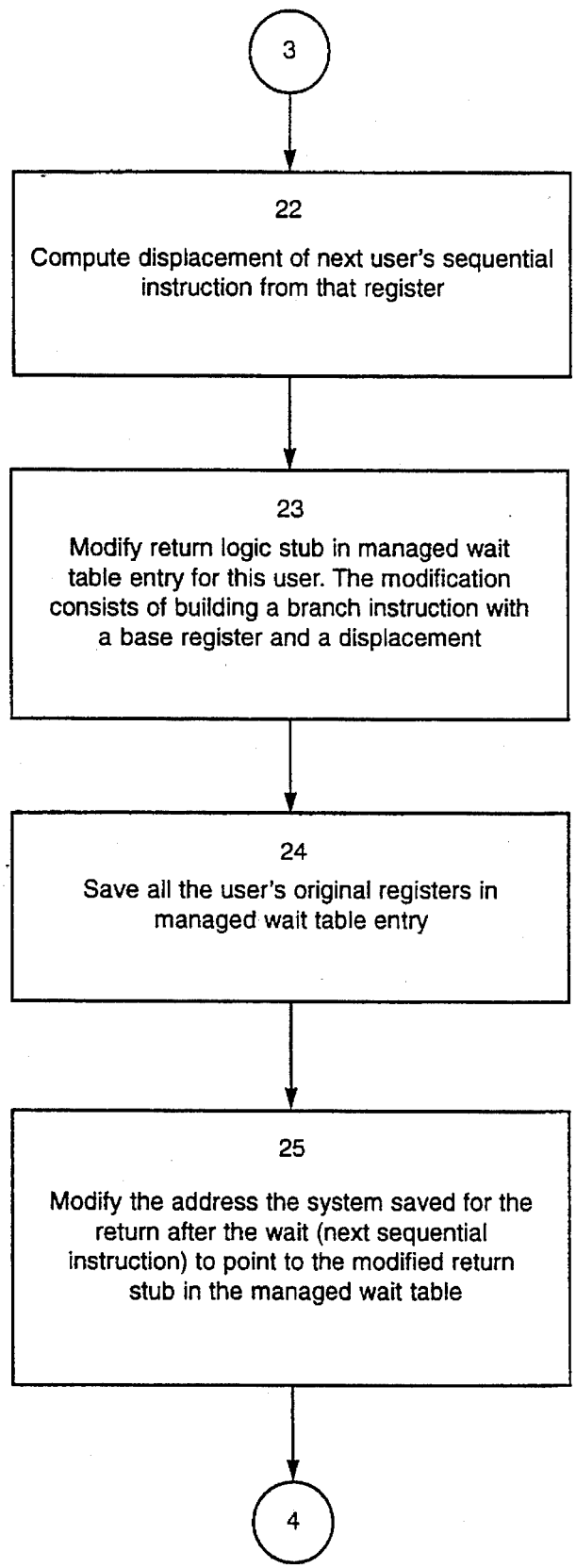

As shown in the flow chart of FIG. 5D, 22., 23., 24., 25. In these steps, the back end is built to restore all of the user's registers and return control to the desired point. This is achieved by saving all the user's registers, at wait time, in its entry in the Managed Wait Table and by customizing a return stub. The stub is also contained in the Managed Wait Table entry. This stub contains the instructions to reset flags, collect statistics, reload all the user's registers, and return control to the desired point from the wait, which was saved by the system, is changed to point to the return stub that was just customized for this user's wait.

Figure 5E:
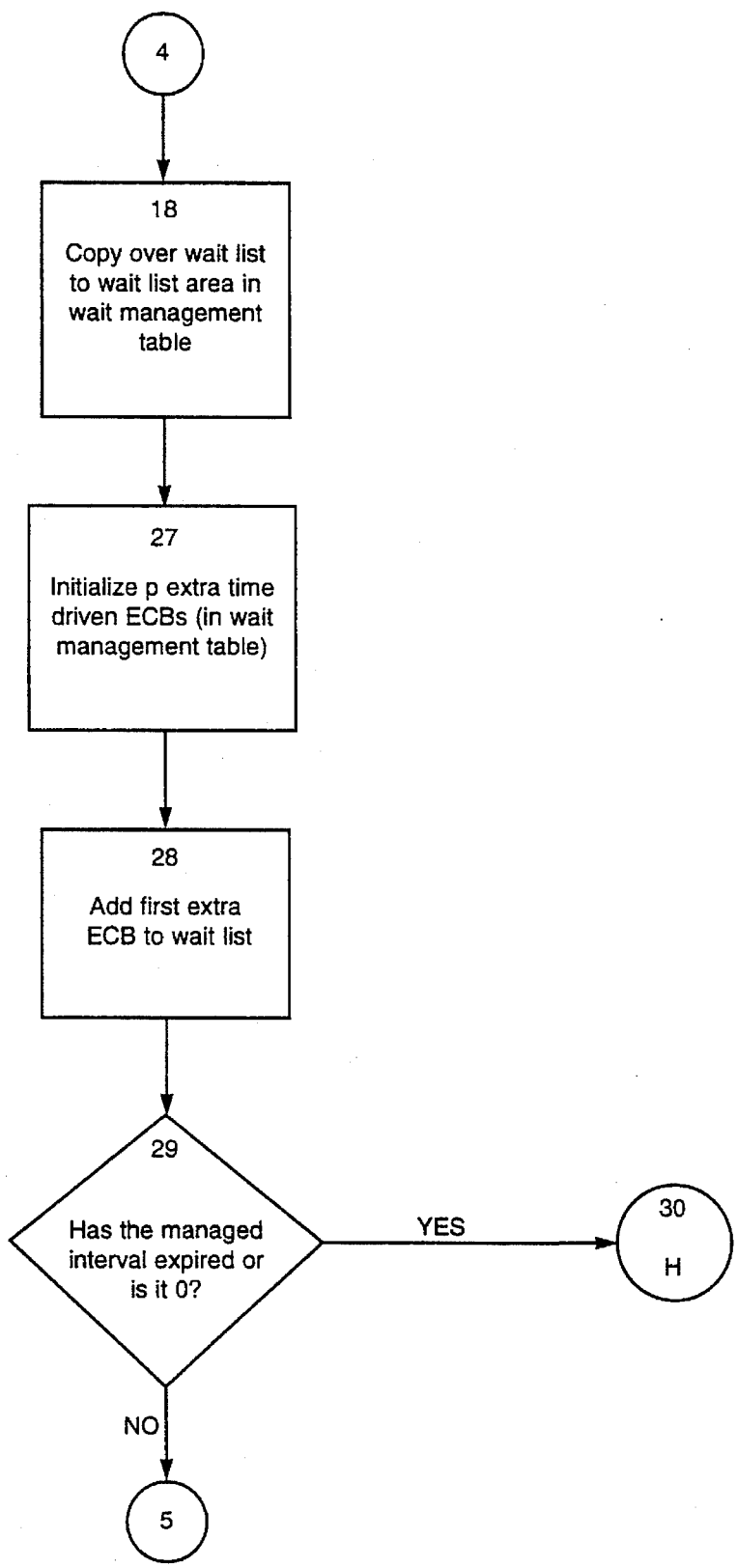

As shown in the flow chart of FIG. 5E, 26. The entire wait list is copied over to the area reserved for it in the Managed Wait Table.

27. Additional managed event control blocks to wait on are initialized. For the preferred implementation, the number is two.

28. The first managed extra event control block is added to the list.

Figure 5F:
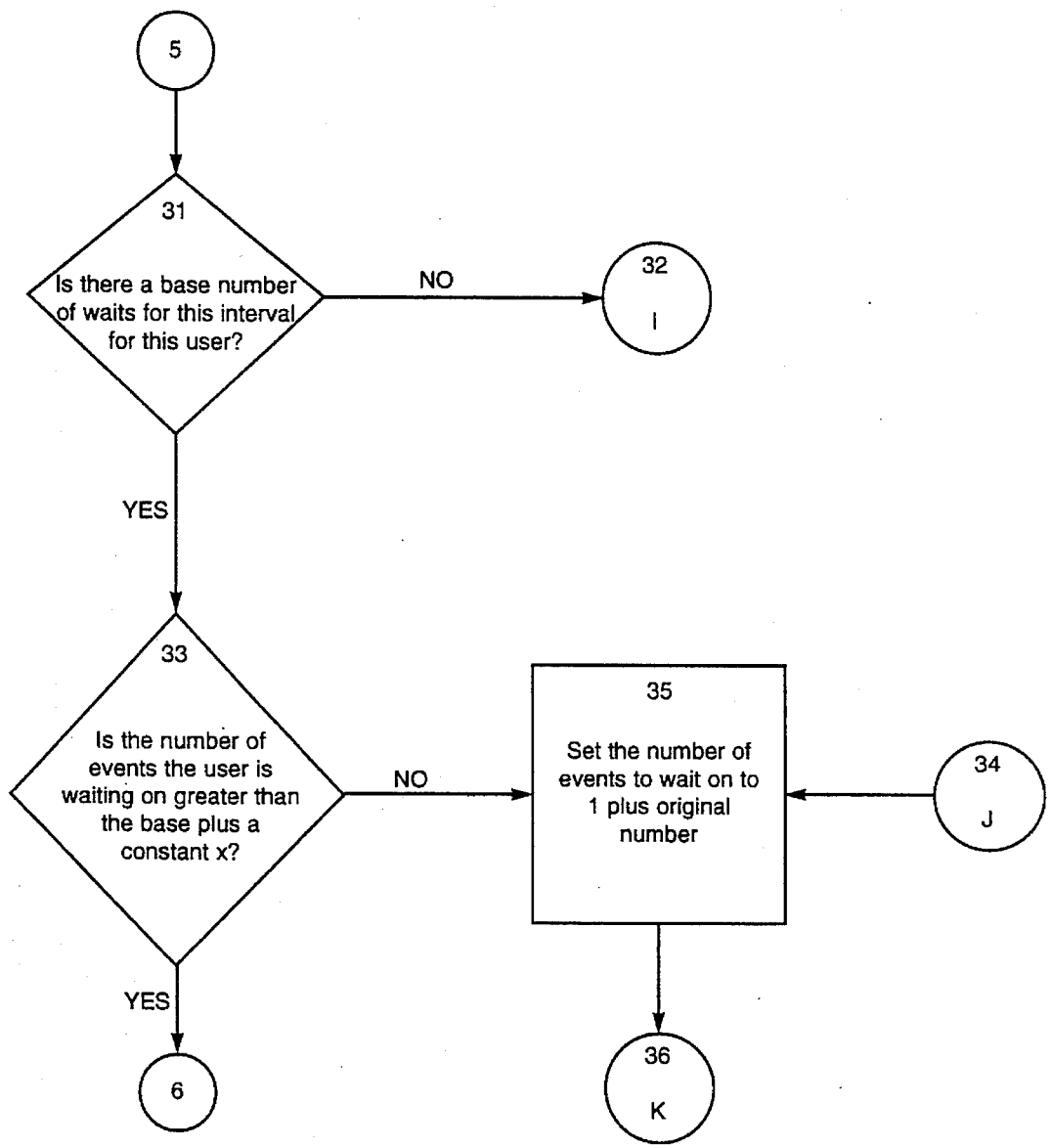

As shown in the flow chart of FIG. 5E–5F, 29., 31., 33., 35. The aim is to use an estimated of events waited on in a no-work wait situation (no work in progress and user waiting for new work) to decide how much work to wait for. (see flow chart beginning with circle I.) If we have no base number of waits to work with, or the number of events waited for is equal to or less than the base number calculated, set the number of events to wait on to one plus the initial number specified. The no-work number of events is recalculated every user defined interval (default— five minutes).

Figure 5G:
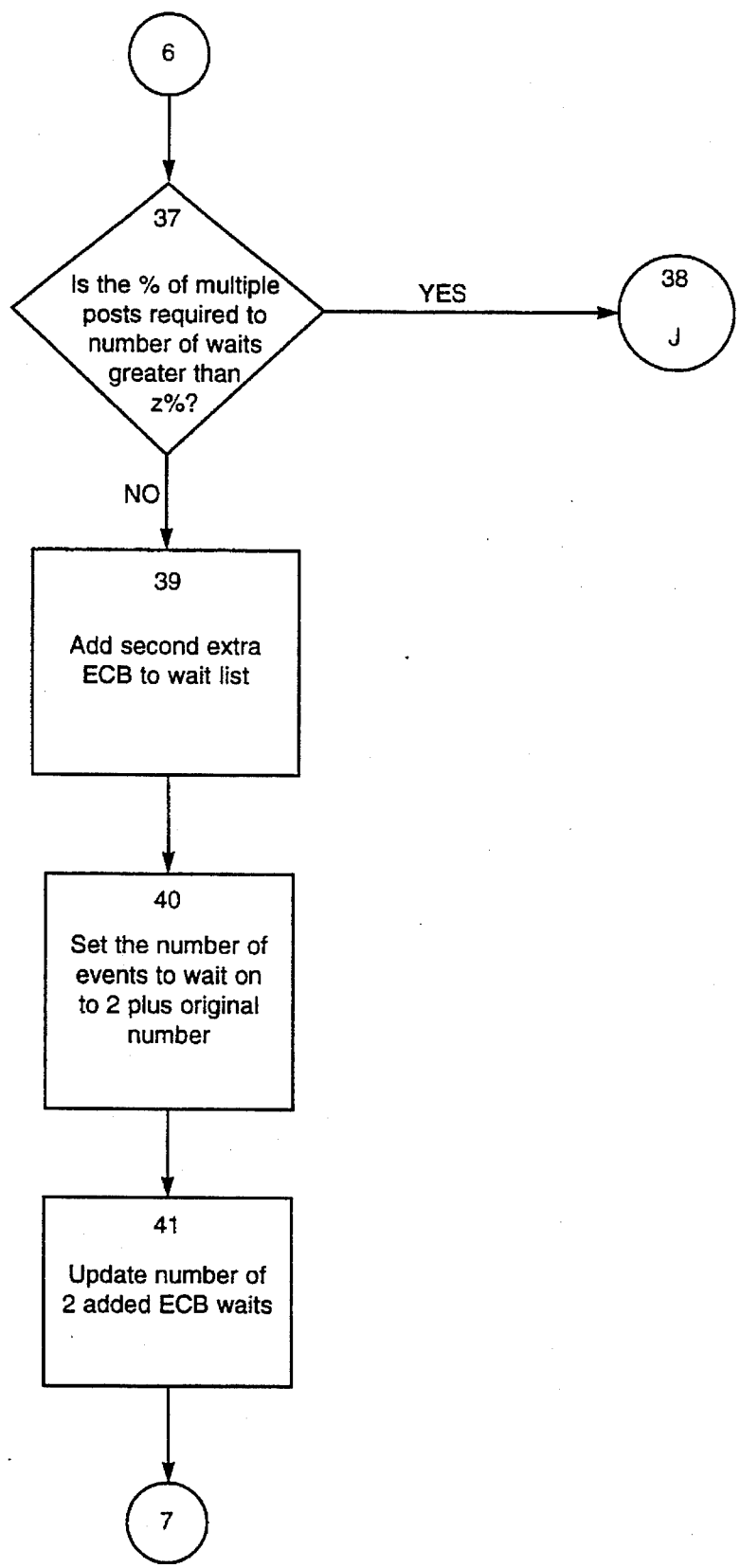

As shown in the flow chart of FIG. 5G, 37., 38., 39., 40., 41. To see whether the user can wait on more than one additional event, two conditions must be met: the number of events waited on must exceed the base plus a constant y (user defined—default 3), and the percentage of times additional posts of the added events must be less than z% (user defined—default 10%). The aim is to wait for the maximum number of events that can occur before the allowed elapsed time for waiting expires. If the user meets this criteria, the number of events he waits on is changed to two additional events plus the number originally specified, and an additional Event Control Block is added to his list of events to wait on.

An important feature of the invention is that 33–41 can be repeated any number of times adding additional events to wait on as the number of events to wait on exceeds the base by ever larger user defined constants. In the preferred implementation, experience has shown that beyond 3 events there is little performance improvement.

Figure 5H:
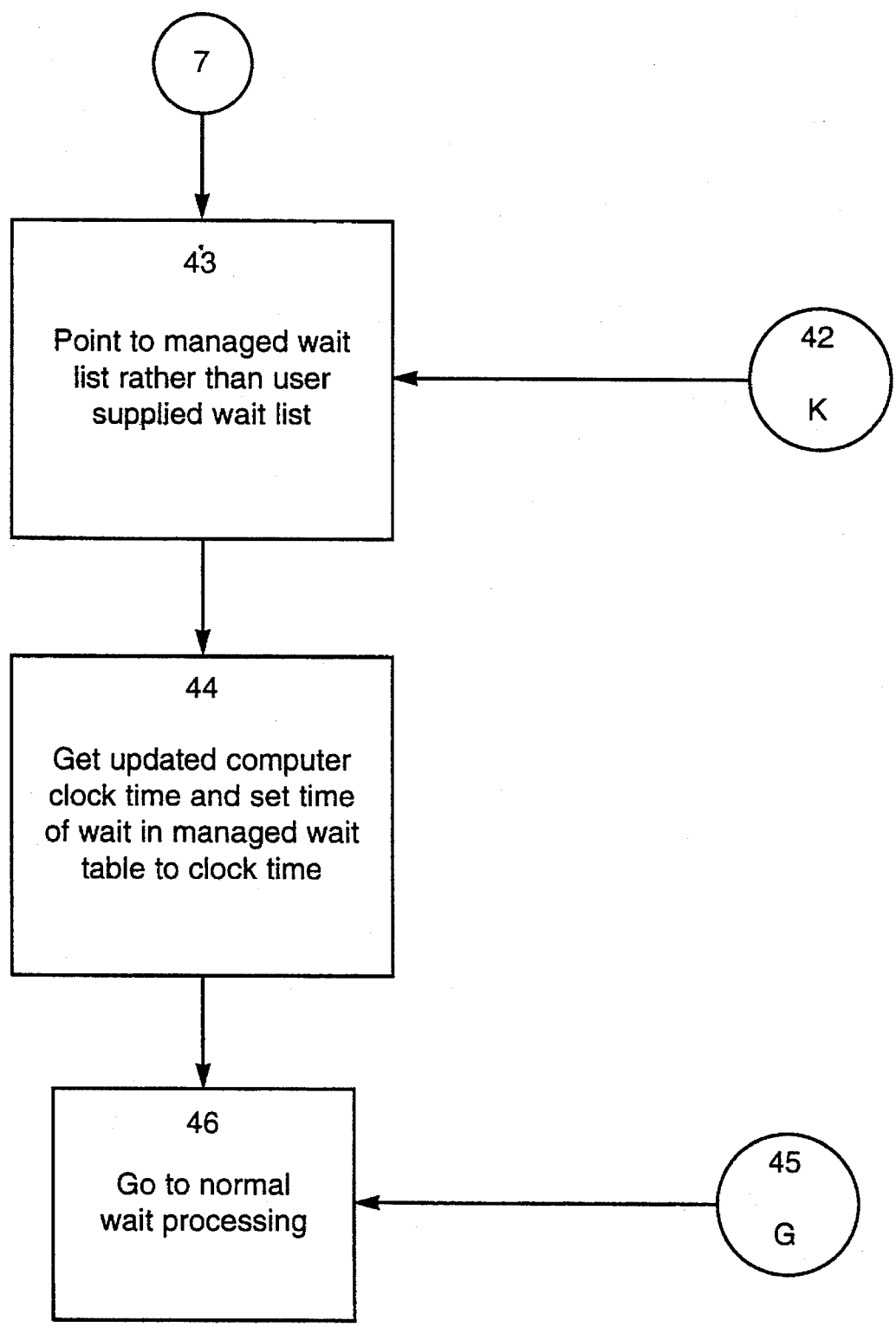
Figure 5I:
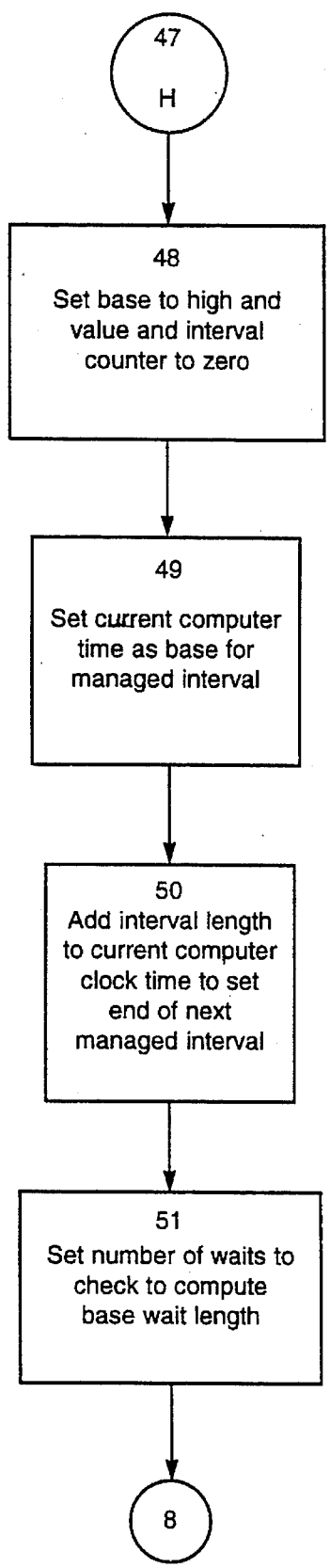
Figure 5J:
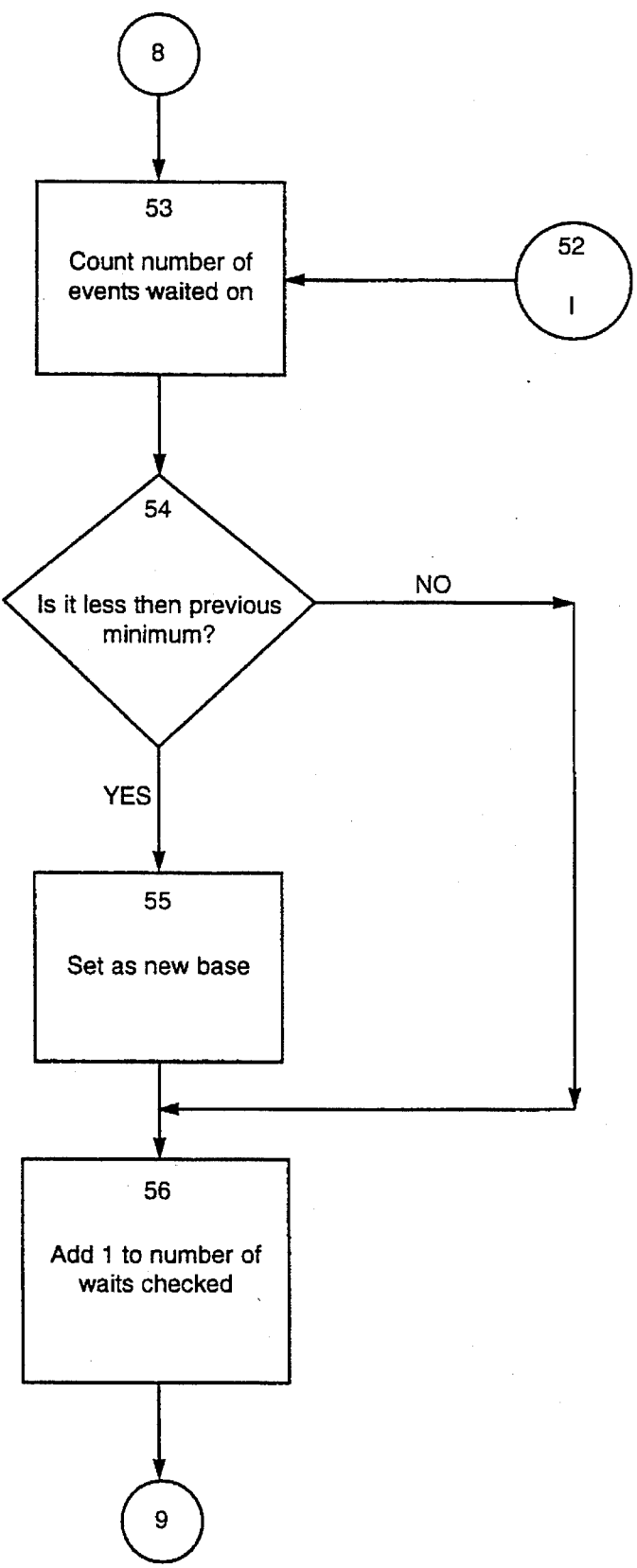
Figure 5K:
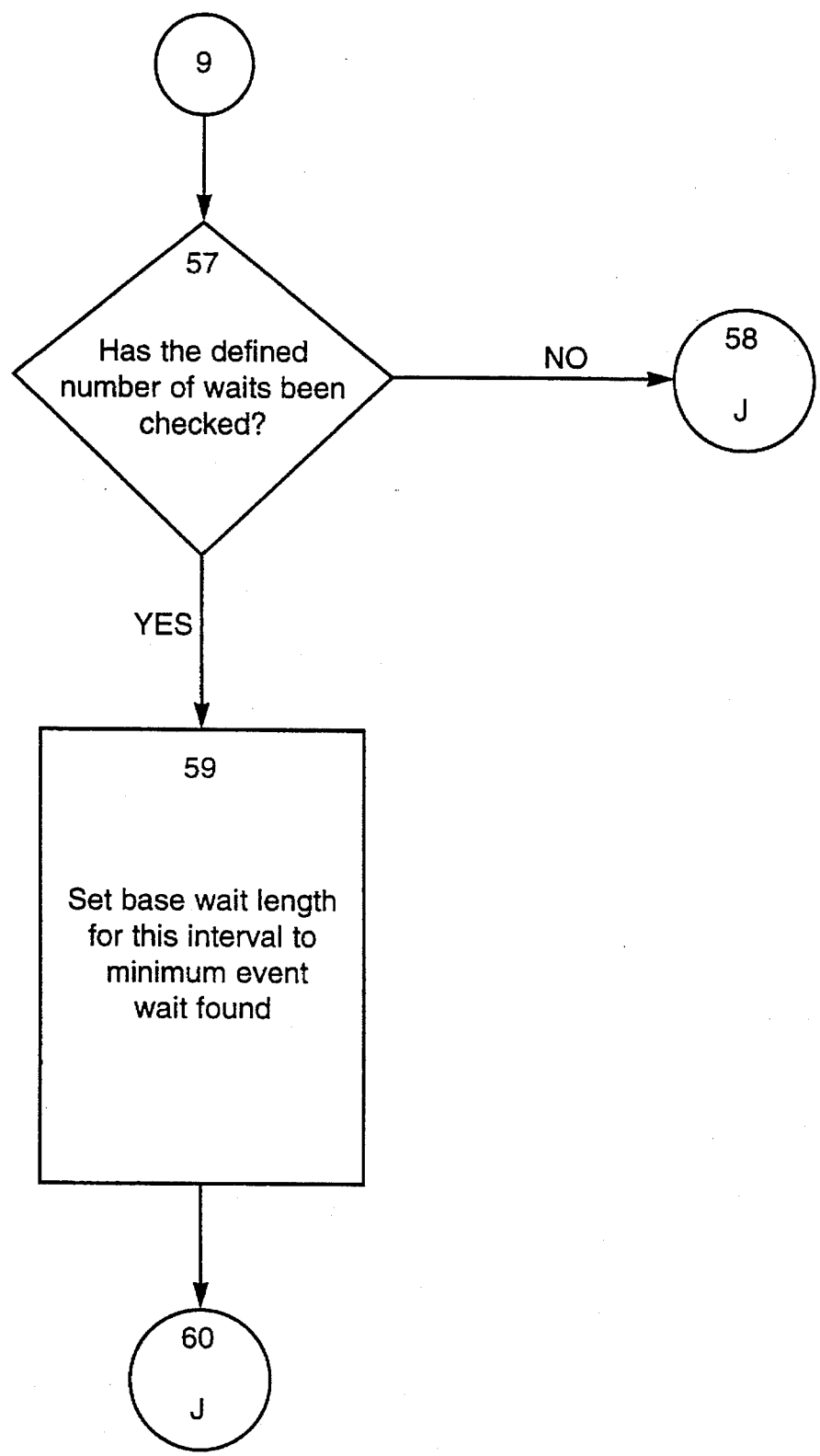

As shown in the flow chart of FIG. 5H, 43., 44., 46. The rest of the setup for the system wait on the modified wait list and modified number of events to wait on is completed. The time of the wait is taken from the computer clock and stored in the Managed Wait Table. Control is passed to the system wait routine.

CALCULATE THE BASE WAIT LENGTH FOR THE INTERNAL

As shown in the flow chart of FIG. 5I–5K, 47–59. Check the first Q (user specified—default 50) waits every interval (user specified—default 5 minutes) to find the smallest number of events the user waits for. This smallest number becomes an estimate for the no-work wait situation, the point where the user has no work in progress and is waiting for more work. The difference between this number and the numbers of events waited on becomes a basis for an estimate of how much work the user is waiting on each time he waits. This check is done at relatively short intervals since both the work load and type of work change frequently in these types of systems.

COMPUTER CLOCK BASED WORK RELATED TIMER FLOWCHART

Figure 6A:
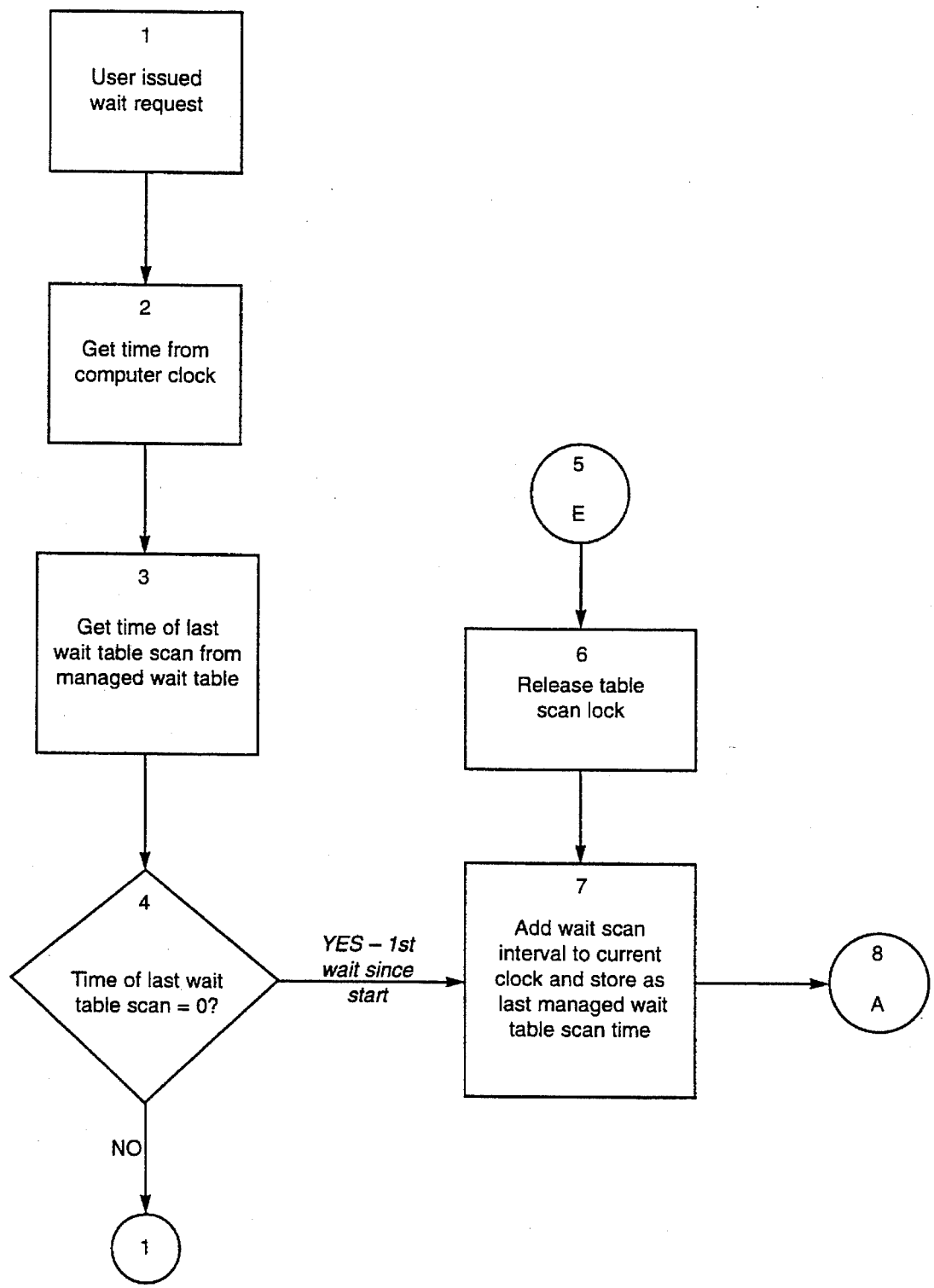
FIGS. 6A–6E are a flow chart of preferred module for a computer clock based work related timer.

As shown in the flow chart of FIG. 6A, 1. As soon as the user requests a wait, control is passed to this routine by the system.

2. The computer hardware clock is directly accessible by a machine instruction. The clock is 64 bits in size and contains the elapsed time since the year 1900. Bit 51 of the clock is advanced each micro-second.

3. The start-up described above has already set up the Managed Wait Table in shared storage and has saved a pointer to this table in this routine.

4. On initialization, the time of last scan of the table was set to 0.

7., 8. Setup the next wait scan and continue wait processing with the Dynamic batch Size Calculation Routine.

Figure 6B:
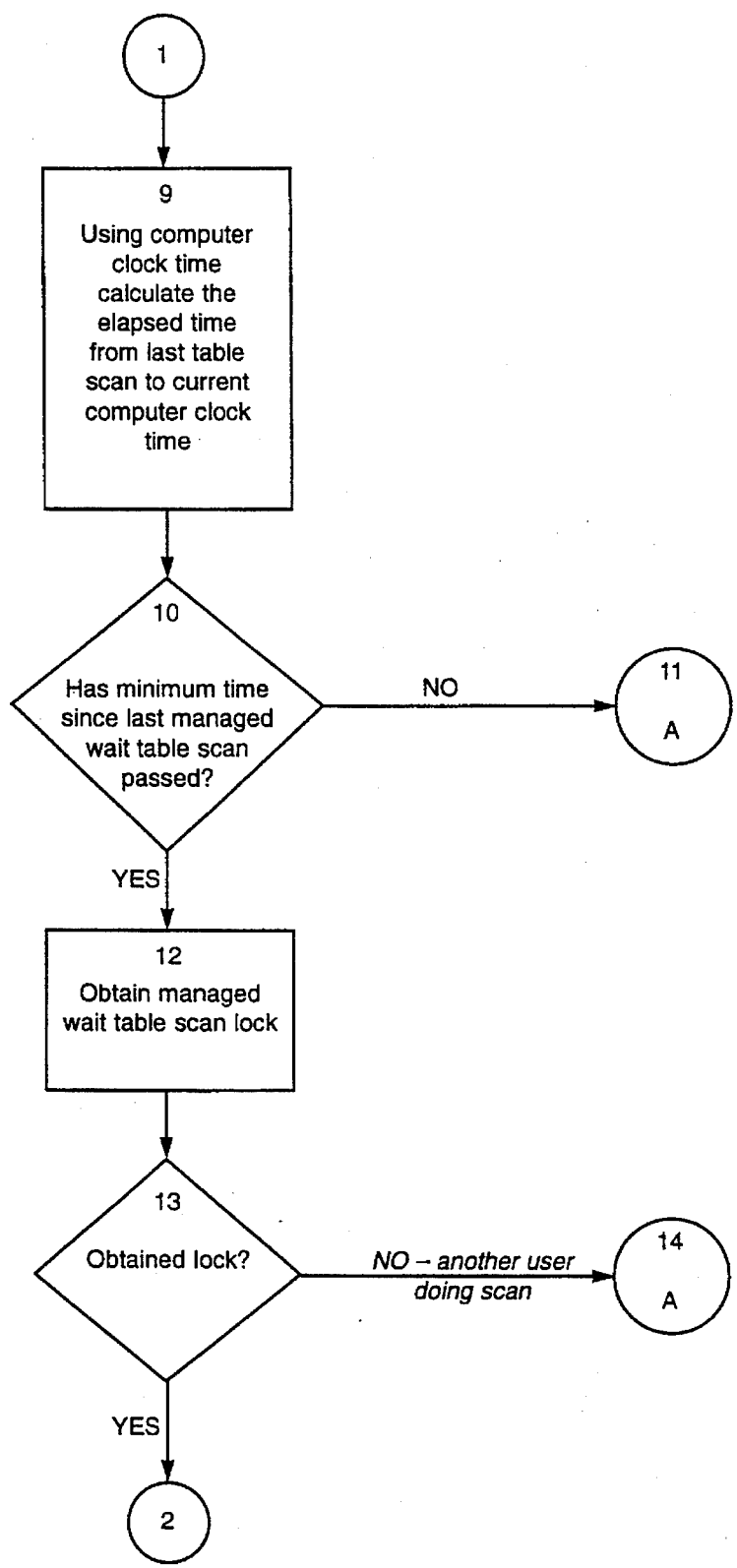

As shown in the flow chart of FIG. 6B, 9., 10., 11. Get current time from the computer clock and check if it is time to scan the Managed Wait Table for users who have exceeded the maximum allowed duration for their wait. This avoids wasted overhead from constantly scanning the table. The time between scans is a user defined limit that is no more than ½ of the smallest allowed wait during for any user. If it is not time to scan table again, continue wait processing with the Dynamic Batch Size Calculation Routine.

12., 13., 14. Since many users may be executing a wait simultaneously on more than one processor, there is no need for more than one user to scan the table. The user tat gets the table lock (implemented in the hardware in the preferred implementation via a Compare and Swap instruction and a Compare And Swap lock) scans the table and performs the required processing. The other users continue wait processing with the Dynamic Batch Size Calculation Routine.

Figure 6C:
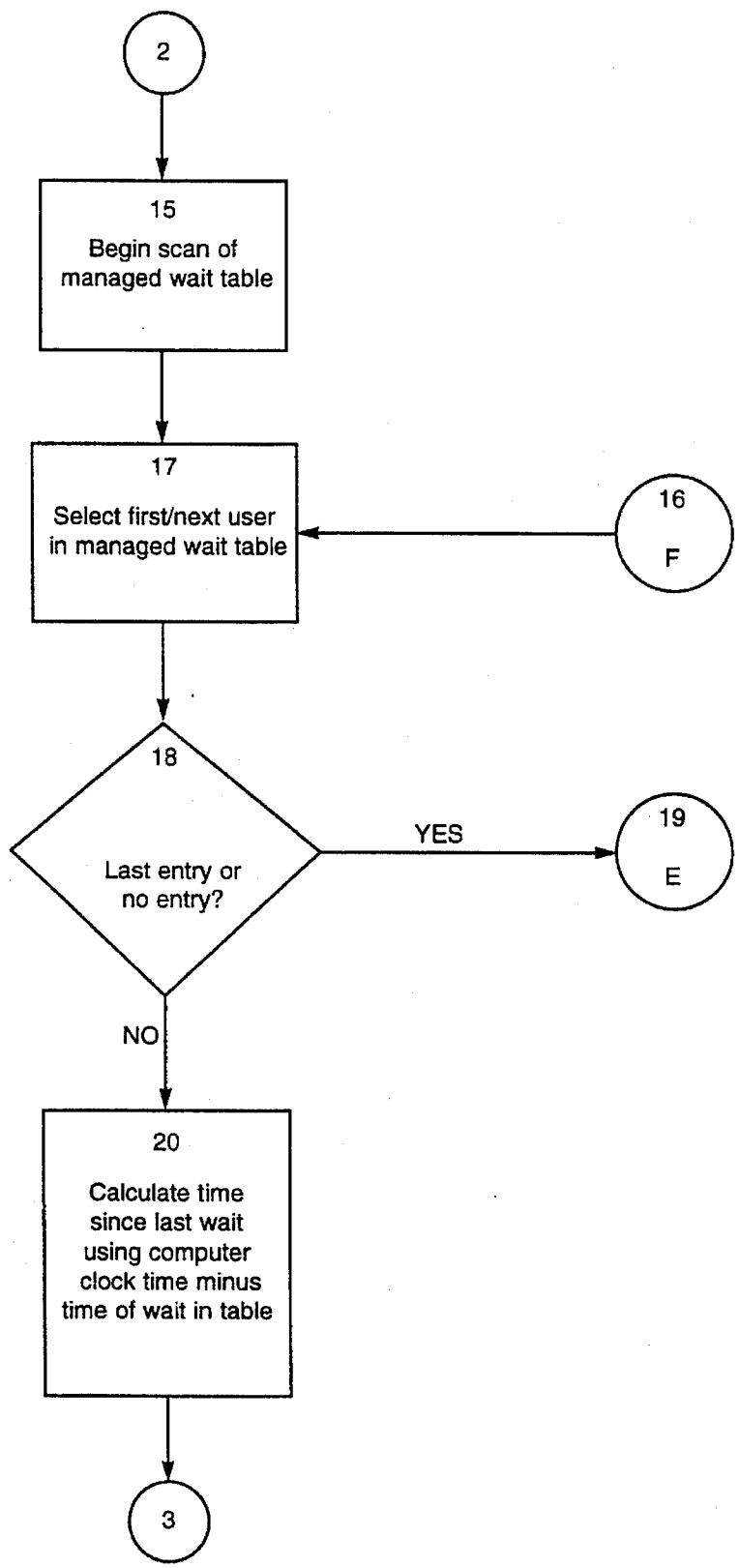

As shown in the flow chart of FIG. 6C, 15., 17., 18., 19. Each entry of the table is checked for a user. If there are no users or the end of the table is reached, the table scan lock is released and wait processing continues with the Dynamic Batch Size Calculation Routine.

Figure 6D:
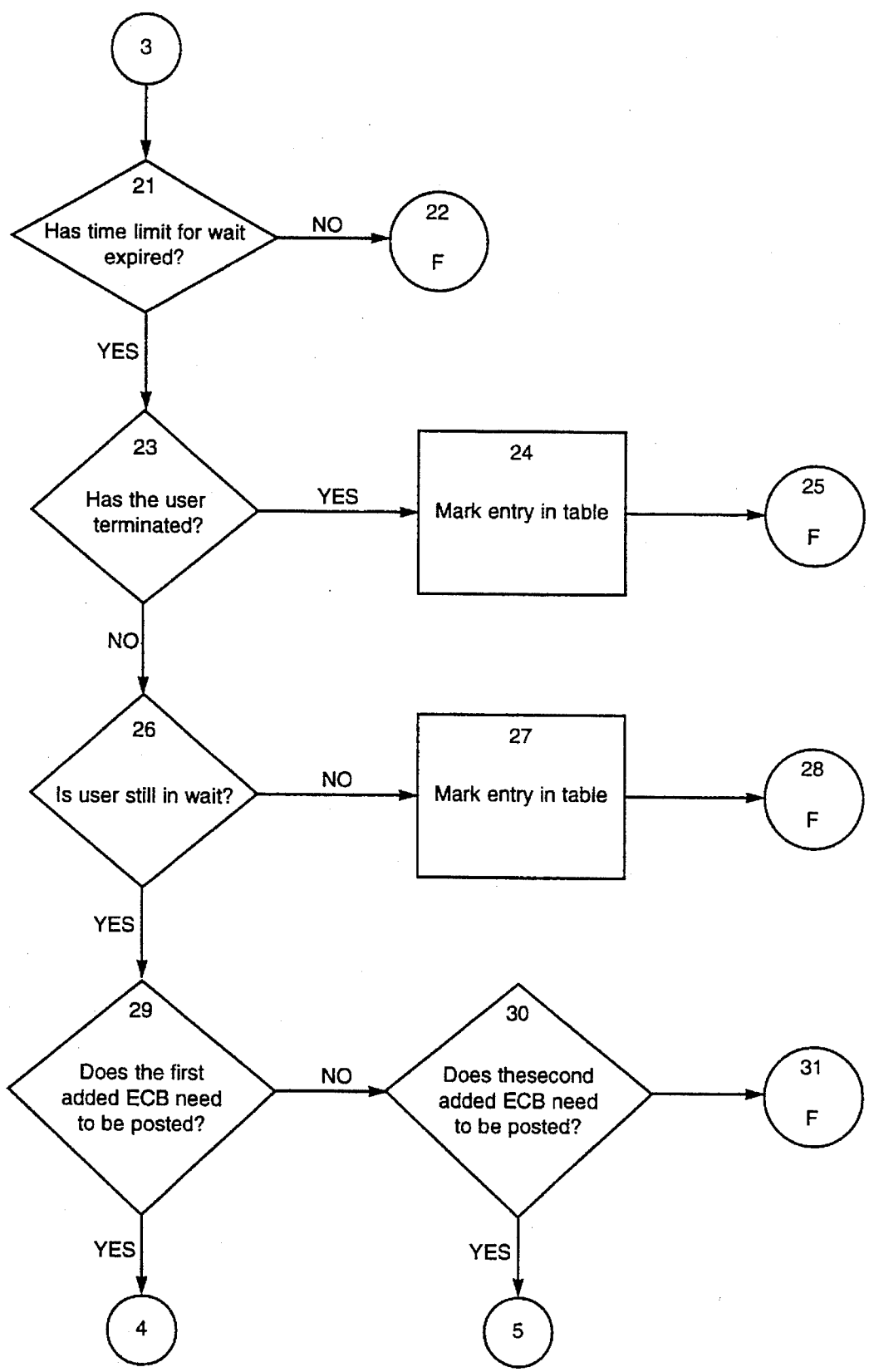
Figure 6E:
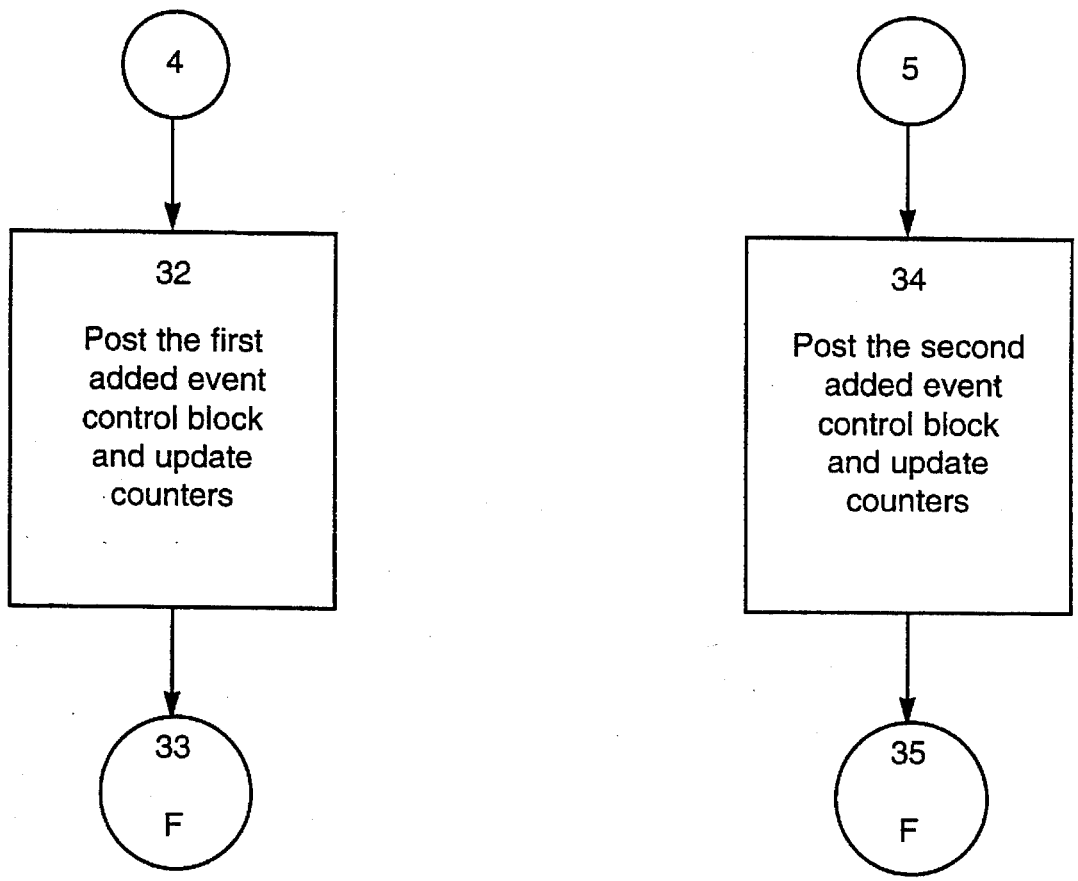

As shown in the flow chart of FIG. 6C–6D, 20., 21., 22., 16. The duration of the user's wait is calculated using the clock time and the time of wait stored in the Managed Wait Table. If the duration has not exceeded the time limit, continue to the next entry in the table. (Note that each user can have its own wait interval. The interval for the user is stored in the Managed Wait Table during start-up. See the Computer Clock Based Dispatching Process Start-up Flowchart.

23., 24., 25., 16. If the duration of wait has passed, the existence of the user must be checked. The user may have terminated or been canceled without proper cleanup. In the preferred implementation, this check is done using the operating system Address Space Control Block (ASCB) and Task Control Block (TCB). Its existence and contents are validated against information stored in the Managed Wait Table. If the user no longer exists, his entry in the table is marked accordingly and the next entry in the table is processed.

26., 17., 28., 16. If the user is not still waiting, mark the table accordingly and go to process next entry. In the preferred implementation, the Management Wait Table contains the Event Control Blocks (ECBs) of the added events. If the first bit of both these control blocks are not on, either the user is not in wait or he has no work to do (i.e., the only completed events are the managed ones).

As shown in the flow chart of FIG. 6C–6E, 29., 32., 33., 16. If the first added ECB has not been posted, post it and continue with next entry.

29., 30., 34., 35., 16. If the first has been posted and the second has not been posted, post the second and continue with next entry.

29., 30., 31., 16. If both have been posted, continue with next entry.

BACK END PROCESSING FLOWCHART

The Back End Processing gets control after the wait has been completed and the system is returning control to what the system considers the user. This point was set up in the Dynamic Batch Size Calculation Routine.

When control is passed to the system wait routine for an eligible wait for an eligible user, four items have been changed by the Dynamic Batch Size Calculation Routine:

a. The pointer to the events waited on (wait list).

b. The number of events to wait on.

c. The address of where control is to be returned after the wait, which not points to this back end.

d. One of the user's registers points to the relevant entry in the Managed Wait Table.

Figure 7:
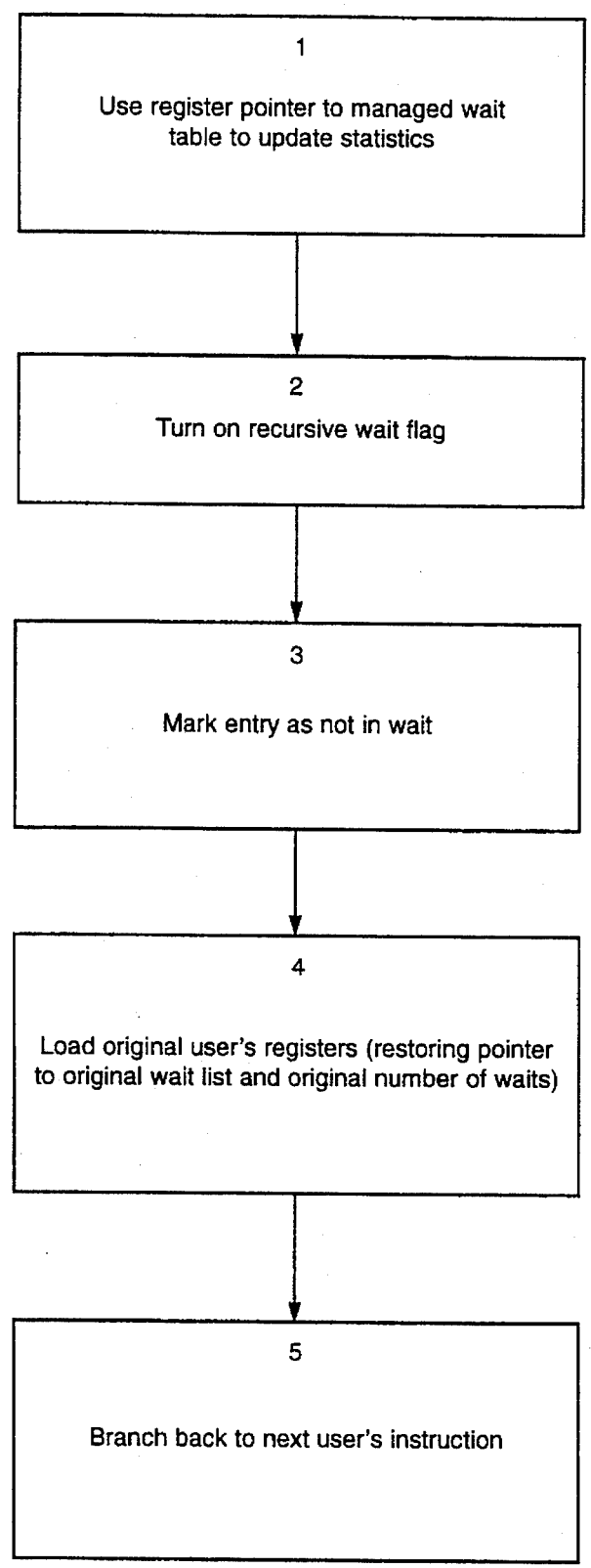
FIG. 7 is a flow chart of a preferred module for back end processing in the present invention.

As shown in the flow chart of FIG. 7, 1., 2., 3. The back end get control with a register pointing to the relevant entry in the Managed Wait Table. Statistics are updated in the table. The recursive wait flag is turned off, and the entry is marked as no wait in progress.

4., 5. All the user's registers are restored from its entry in the Managed Wait Table entry. At this point, addressability has been lost to the Managed Wait Table and to the return stub. The computer will execute the next sequential instruction, which is the customized branch instruction, using one of the user's original registers to return control to where the user expects to regain control after the wait.

COMPUTER CLOCK BASED DISPATCHING PROCESS TERMINATION FLOWCHART

The start-up job or started task waits for a termination command from the operator in order to restore normal dispatching.

Figure 8A:
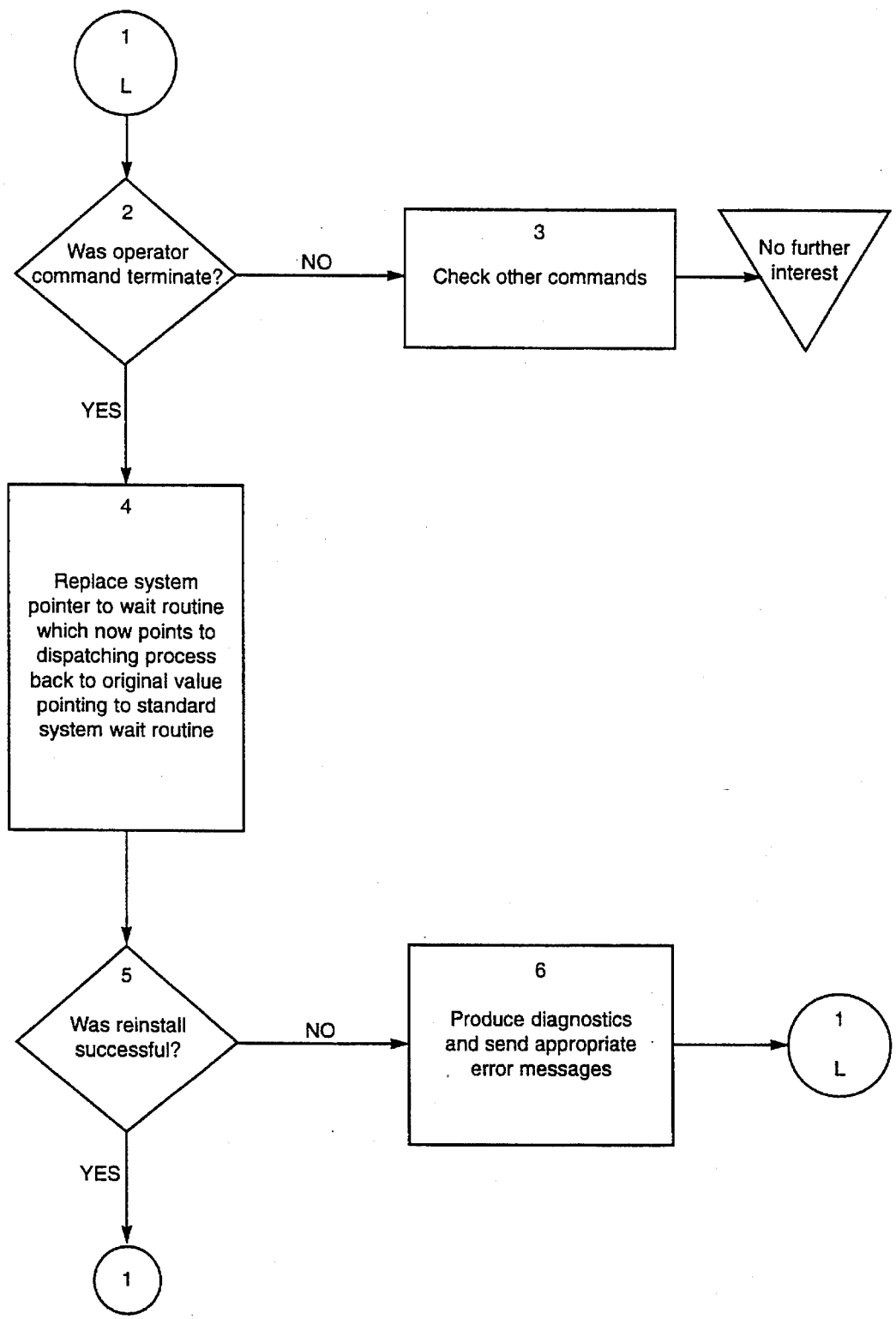
FIGS. 8A–8D are a flow chart of a preferred module for computer clock based dispatching process termination in the present invention.

As shown in the flow chart of FIG. 8A, 1., 2., 3. The start-up job or task has received an operator command. If it is not a termination request, it is not of further interest here.

4., 5., 6., 7. The key part of termination is executed here. The original pointer to the system wait routine is restored. All new waits now go through the standard waiting process. However, there may be users already waiting using the new dispatching process and they have to be managed. If the reinstall failed, produce diagnostics and wait for next command.

Figure 8B:
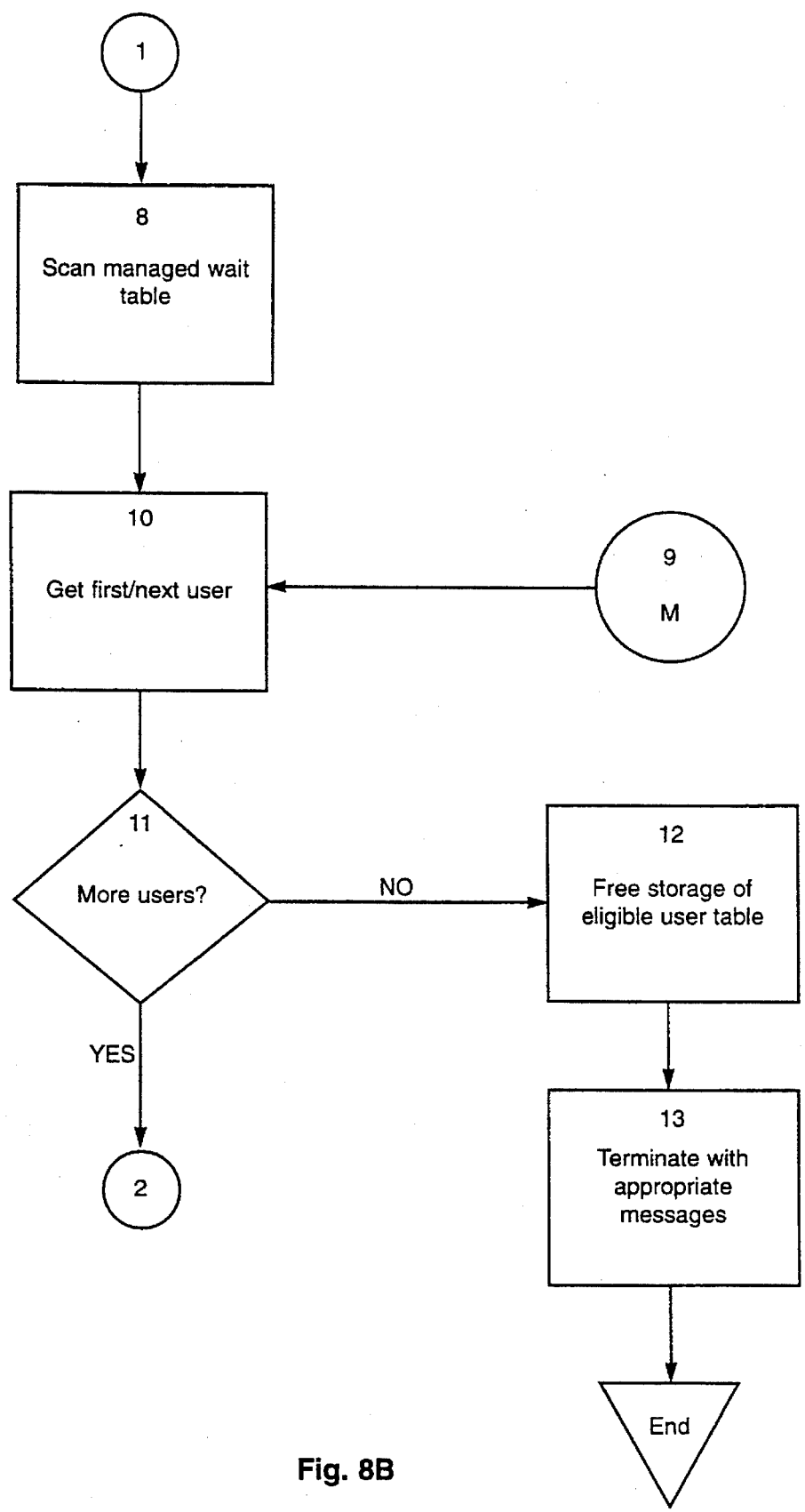

As shown in the flow chart of FIG. 8B, 8., 10., 11. Scan the Managed Wait Table looking for managed users who are active at termination time.

Figure 8C:
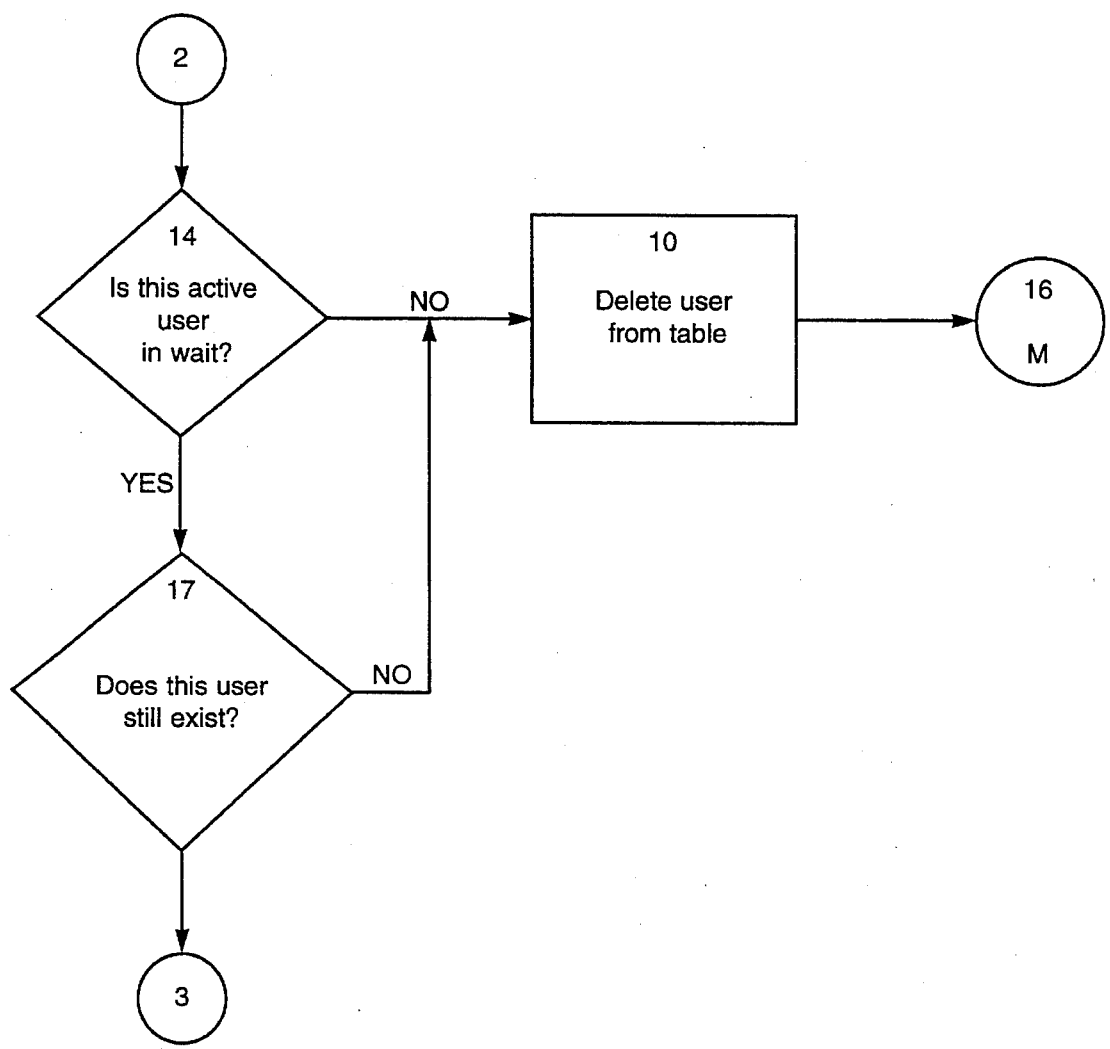

As shown in the flow chart of FIG. 8C, 14., 15., 16., 17., 9. For all users found, check if the user is in wait or if he still exists. If not, release the entry and check the next user.

Figure 8D:
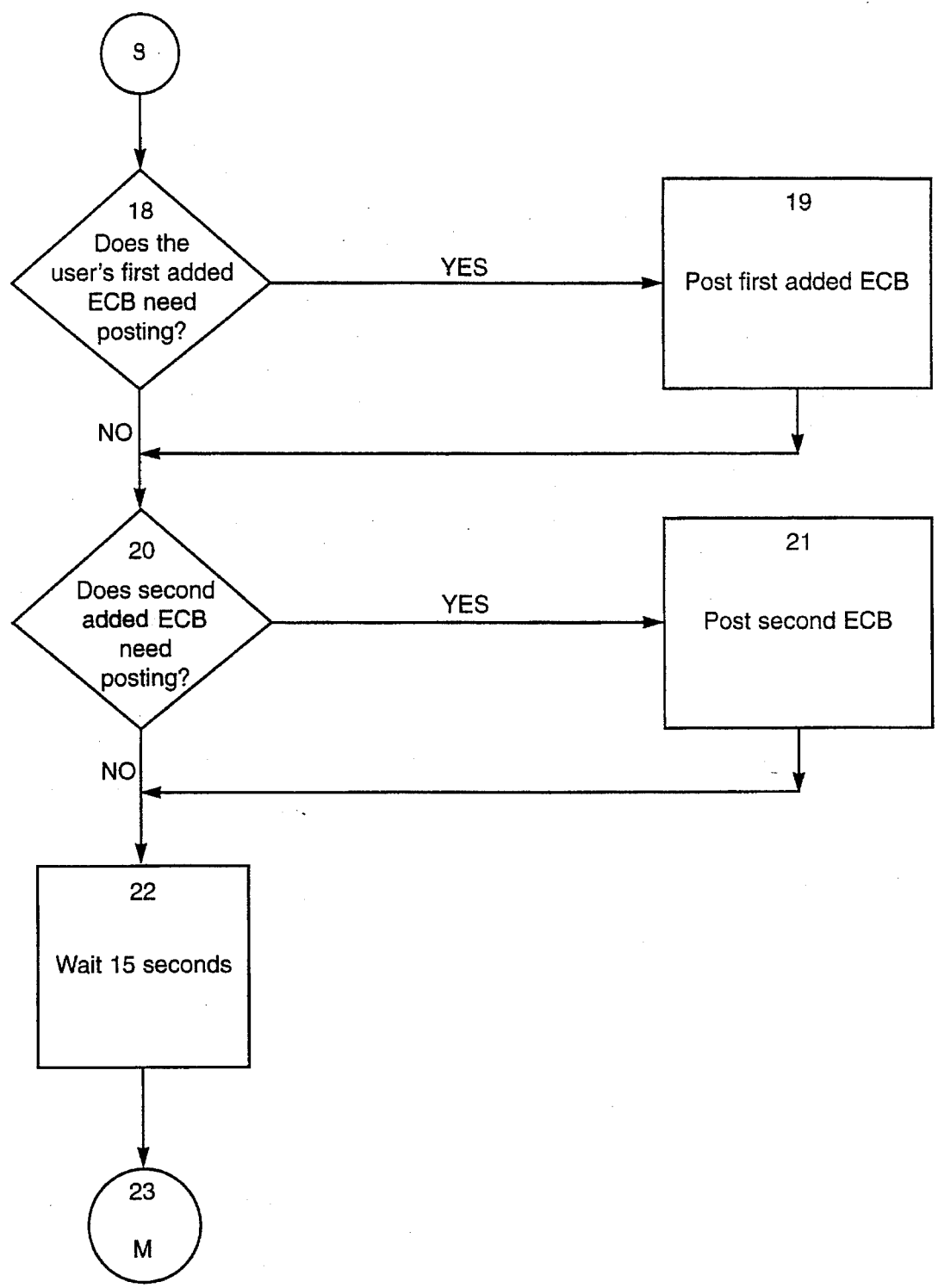

As shown in the flow chart of FIG. 8D, 18., 19., 20., 21. Post any added ECBs that require posting in order to try to dispatch the user.

22., 23., 9. Wait 15 seconds and repeat the process with the next user. The wait is necessary to give posted users a chance to be dispatched and eligible for deletion from the list.

As shown in the flow chart of FIG. 8B, 11., 12. The table has been scanned once and all posts issued. The Managed Wait Table cannot be freed since it may take a significant amount of time for active users in wait to be dispatched. They still have to wait on at last one of their own events to occur. The Eligible User Table can be freed.

13. Termination completes with appropriate messages.

Although the preferred embodiment of the invention has been described with specific reference to one construction, the invention is not so limited and should be defined by the following claims.

I claim:

1. A computer system having a hardware timer clock for executing tasks requested by multiple users at random times, said computer system having a central processor connected by a bus to a digital memory containing memory locations for signals received at random times from said users, said central processor connected by data lines to predetermined system resources and controlled by an operating system stored in said digital memory, having means to trigger wait means in said operating system in response to signals from said users, said wait means comprising means to postpone execution of tasks associated with said signals, said tasks comprising operating system calls on routines that send signals on said data lines to said system resources, said computer system having within said digital memory dynamic task batching means called by said means to trigger wait means, said dynamic task batching means comprising a dynamic batch calculation mechanism for building a wait list in a managed wait table in a portion of said digital memory, a computer clock based work related timer for storing time values in said managed wait table, said managed wait table residing in a portion of said digital memory shared by both said dynamic batch calculation mechanism and said computer clock based work related timer, said dynamic task batching means determining the conditions when a wait list should be enlarged or timed out.

2. The computer system for executing tasks requested by multiple users at random times of claim 1 wherein said dynamic batch calculation mechanism comprises means to store for each user in said managed wait table a value of a dynamic batch size and a value indicative of the number of elements to wait on requested by said user, wherein the value for the dynamic batch size is a decreasing function of the value indicative of the number of events waited on requested by said user and wherein said dynamic batching means comprises means for limiting said number of events waited on to said dynamic batch size.

3. The computer system for executing tasks requested by multiple users at random times of claim 1 wherein a routine calling the execution of said task is addressed via a vector pointing to the operating system wait list routines and said dynamic batch calculation mechanism captures said vector and redirects it to a wait list built by the dynamic batch calculation mechanism in the managed wait table.

4. The computer system for executing waits requested by multiple users at random times of claim 1 wherein said conditions where the wait list should be enlarged comprise the original number of waits for the particular user, the number of events when there is no work, and the number of times that extra events were built into the managed wait table for the particular user.

5. The computer system for executing tasks requested by multiple users at random times of claim 1 wherein said dynamic task batching means comprises means to poll said managed wait table and said computer clock based work related timer comprises means to provide current clock time to the managed wait table whenever polling the managed wait table.

6. The computer system for executing tasks requested by multiple users at random times of claim 1 wherein said managed wait table comprises the following data:

user name and associated control block information for uniquely identifying a user and checking its continued existence, the time of last trigger of wait means, the maximum wait duration allowed for this user, a list adapted to hold a predetermined number of events that are waited on, user's CPU utilization during a predetermined number of previous waits, a predetermined number of event control blocks that are posted at the completion of an event, a save area to save user's registers and other necessary data, and a return routine stub to get control after a wait instead of the user's routine and completely restore the user's environment before returning control to the user's routine.

7. The computer system for executing tasks requested by multiple users at random times of claim 1 wherein said computer clock timer means present in the system comprises means to execute with about 99.9% confidence at about 20 times per second.

8. The computer system for executing tasks requested by multiple users at random times of claim 1 wherein the computer clock work related timer comprises time comparator means to compare the time when any task in the system waits, and means to mark for dispatch any task with work waiting past an allowed wait time duration threshold.

9. The computer system for executing tasks requested by multiple users at random times of claim 8 wherein said time comparator means comprises means to scan the wait management table and posting one event per user per scan.

10. The computer system for executing tasks requested by multiple users at random times of claim 9 additionally having means to record as data the overhead of adding events and adjusting the number of events waited on.

11. The computer system for executing tasks requested by multiple users at random times of claim 8 having means to insure execution at least once in about 5 milliseconds.

12. The computer system for executing tasks requested by multiple users at random times of claim 1 having a wait back end to restore values and pass control to a normal system wait routine.

13. The computer system for executing tasks requested by multiple users at random times of claim 1 having means to eliminate recursive waits.

14. A computer system for executing tasks requested by multiple users at random times, said computer system having a central processor connected by a bus to a digital memory containing memory locations for signals received at random times from said users, said central processor connected by data lines to predetermined system resources and controlled by an operating system stored in said digital memory, having means to trigger wait means in said operating system in response to signals from said users, said wait means comprising means to postpone execution of tasks associated with said signals, said tasks comprising operating system calls on routines that send signals on said data lines to said system resources, said computer system having within said digital memory dynamic task batching means called by said means to trigger wait means, said dynamic task batching means comprising a computer clock based work related timer for storing time values in a managed wait table.

15. The computer system for executing tasks requested by multiple users at random times of claim 14 wherein a routine calling the execution of said task is addressed via a vector pointing to the operating system wait list routines.

16. The computer system for executing tasks requested by multiple users at random times of claim 14 wherein said dynamic task batching means comprises means to poll said managed wait table and said computer clock based work related timer comprises means to provide current clock time to the managed wait table whenever polling the managed wait table.

17. The computer system for executing tasks requested by multiple users at random times of claim 14 wherein said managed wait table comprises the following data:

user name and associated control block information for uniquely identifying a user and checking its continued existence, the time of last trigger of wait means, the maximum wait duration allowed for this user, a list adapted to hold a predetermined number of events that are waited on, user's CPU utilization during a predetermined number of previous waits, a predetermined number of event control blocks that are posted at the completion of an event, a save area to save user's registers and other necessary data, and a return routine stub to get control after a wait instead of the user's routine and completely restore the user's environment before returning control to the user's routine.

18. The computer system for executing tasks requested by multiple users at random times of claim 14 wherein said computer clock timer means present in the system comprises means to execute with about 99.9% confidence at about 20 times per second.

19. The computer system for executing tasks requested by multiple users at random times of claim 14 wherein the computer clock work related timer comprises time comparator means to compare the time when any task in the system waits, and means to mark for dispatch any task with work waiting past an allowed wait time duration threshold.

20. The computer system for executing tasks requested by multiple users at random times of claim 19 wherein said time comparator means comprises means to scan the wait management table and posting at least one event per user per scan.

21. The computer system for executing tasks requested by multiple users at random times of claim 20 additionally having means to record as data the overhead of adding events and adjusting the number of events waited on.

22. The computer system for executing tasks requested by multiple users at random times of claim 19 having means to insure execution at least once in about 5 milliseconds.

23. The computer system for executing tasks requested by multiple users at random times of claim 14 having a wait back end to restore values and pass control to a normal system wait routine.

24. The computer system for executing tasks requested by multiple users at random times of claim 14 having means to eliminate recursive waits.

25. A computer system having a hardware timer clock for executing tasks requested by multiple users at random times, said computer system having a central processor connected by a bus to a digital memory containing memory locations for signals received at random times from said users, said central processor connected by data lines to predetermined system resources and controlled by an operating system stored in said digital memory, having means to trigger wait means in said operating system in response to signals from said users, said wait means comprising means to postpone execution of tasks associated with said signals, said tasks comprising operating system calls on routines that send signals on said data lines to said system resources, said computer system having within said digital memory task batching means called by said means to trigger wait means, said task batching means comprising a mechanism for building a wait list in a managed wait table in a portion of said digital memory, a computer clock based work related timer for storing time values in said managed wait table.

* * * * *